US 7,848,521 B2

United States Patent
Leporini et al.

(10) Patent No.: US 7,848,521 B2
(45) Date of Patent: Dec. 7, 2010

(54) TRANSMITTING AND PROCESSING PROTECTED CONTENT

(75) Inventors: David Leporini, Paris cedex (FR); Frederic Dublanchet, Paris Cedex (FR); Andre Surcouf, Paris Cedex (FR); Nicolas Gaude, Paris Cedex (FR); Eric Delaunay, Paris Cedex (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 925 days.

(21) Appl. No.: 10/362,110

(22) PCT Filed: Aug. 24, 2001

(86) PCT No.: PCT/IB01/01845

§ 371 (c)(1), (2), (4) Date: Jun. 4, 2003

(87) PCT Pub. No.: WO02/17635

PCT Pub. Date: Feb. 28, 2002

(65) Prior Publication Data

US 2003/0182579 A1    Sep. 25, 2003

(30) Foreign Application Priority Data

Aug. 24, 2000  (EP)  ................................. 00402349

(51) Int. Cl.
  *H04N 7/167* (2006.01)
  *G06F 21/00* (2006.01)
(52) U.S. Cl. ........................ 380/241; 380/210; 380/227; 380/239; 380/240; 380/242; 705/51; 705/52; 705/55; 705/58
(58) Field of Classification Search ................. 380/210, 380/227–234, 239–242; 705/51–52, 55, 705/58
See application file for complete search history.

(56) References Cited

U.S. PATENT DOCUMENTS 5,224,161 A    6/1993   Daniel et al. .................. 380/14

(Continued)

FOREIGN PATENT DOCUMENTS

EP    0 898 425 A2    2/1999

(Continued)

OTHER PUBLICATIONS

"Functional Model of a Conditional Access System"; 8301 EBU Review Technical, No. 266, Winter 1995, Grand-Saconnex, CH; pp. 64-77.

*Primary Examiner*—William R Korzuch
*Assistant Examiner*—Trang Doan
(74) *Attorney, Agent, or Firm*—Osha Liang LLP

(57) ABSTRACT

A method for transmission and storing of scrambled content in which the scrambled content is transmitted together with encrypted control words, the control words being used for descrambling the scrambled content, transmitting to a receiver/decoder the scrambled content and encrypted control words, said control words being encrypted by an exploitation key ($K_G$), decrypting said encrypted control words in a removable security module with an exploitation key ($K_G$), said removable security module being received by the receiver/decoder, characterised in that it further includes transmitting usage rules message (URM) to the receiver/decoder (2000), which usage rules (URM) impose usage constraints on the playback of the content stored on a mass storage device encrypting the decrypted encrypted control words and usage rules messages by a local key ($K_L$) to produce encrypted control management messages (CMM) storing said scrambled content and encrypted control management message on the mass storage device of the receiver/decoder.

22 Claims, 21 Drawing Sheets

U.S. PATENT DOCUMENTS

| | | | |
|---|---|---|---|
| 5,796,828 A * | 8/1998 | Tsukamoto et al. | 380/203 |
| 5,845,281 A | 12/1998 | Benson et al. | 707/9 |
| 5,862,299 A * | 1/1999 | Lee et al. | 386/94 |
| 5,915,025 A * | 6/1999 | Taguchi et al. | 380/44 |
| 6,005,631 A | 12/1999 | Anderson et al. | 348/460 |
| 6,005,938 A | 12/1999 | Banker et al. | 380/20 |
| 6,104,860 A | 8/2000 | Lee et al. | 386/94 |
| 6,289,455 B1 * | 9/2001 | Kocher et al. | 713/194 |
| 6,292,568 B1 * | 9/2001 | Akins, III et al. | 380/239 |
| 6,550,011 B1 * | 4/2003 | Sims, III | 713/193 |
| 6,697,489 B1 * | 2/2004 | Candelore | 380/200 |
| 6,714,650 B1 * | 3/2004 | Maillard et al. | 380/231 |
| 6,738,905 B1 * | 5/2004 | Kravitz et al. | 713/194 |
| 6,789,188 B1 * | 9/2004 | Epstein et al. | 713/155 |
| 7,023,992 B1 * | 4/2006 | Kubota et al. | 380/210 |

FOREIGN PATENT DOCUMENTS

| | | |
|---|---|---|
| EP | 0936774 * | 8/1999 |
| EP | 936774 A1 * | 8/1999 |
| FR | 2 732 537 | 10/1996 |
| WO | WO 98/43426 | 10/1998 |
| WO | WO 9843426 A1 * | 10/1998 |
| WO | WO 99/07148 | 2/1999 |
| WO | WO 99/07150 | 2/1999 |
| WO | WO 99/45711 | 9/1999 |
| WO | WO 99/53689 | 10/1999 |
| WO | WO 00 04688 | 1/2000 |

* cited by examiner

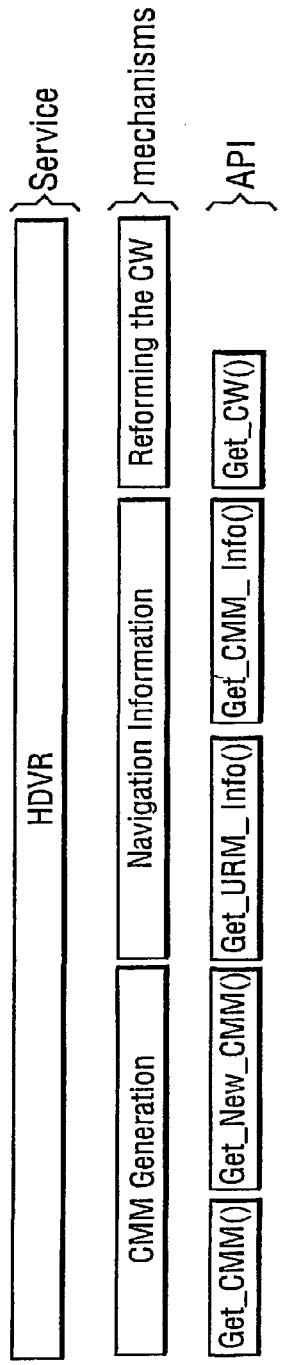
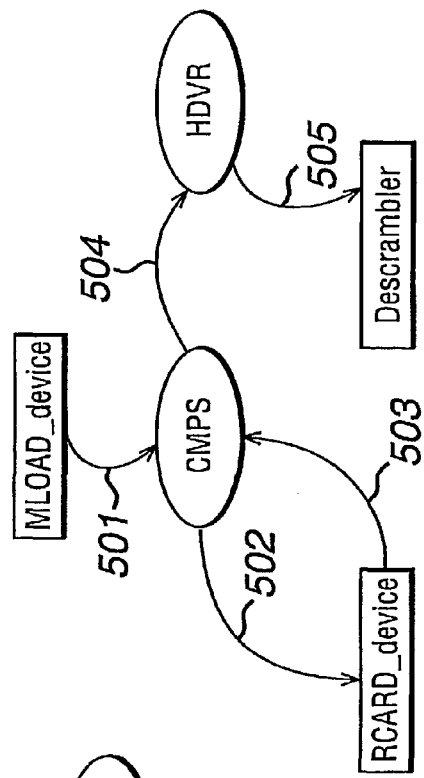
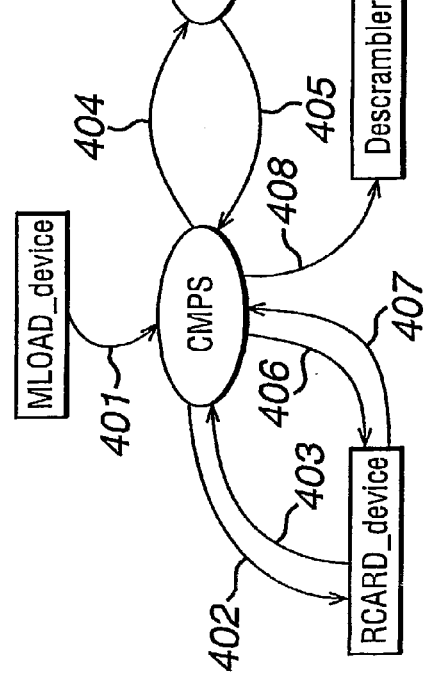

FIG. 26
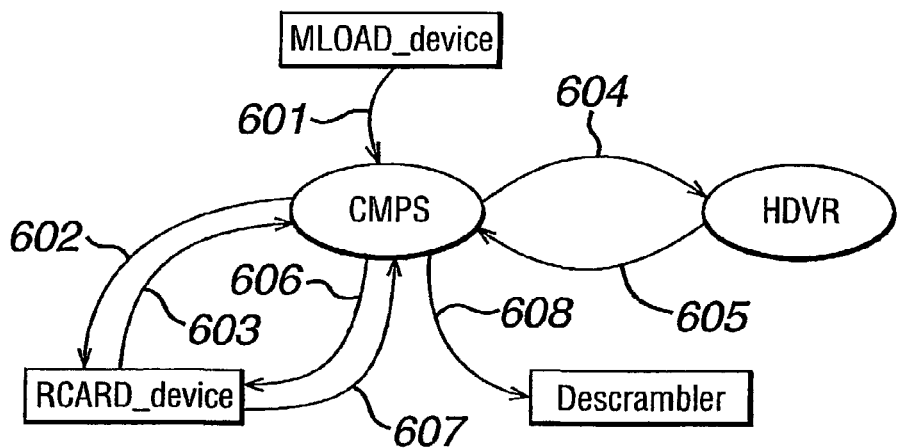
FIG. 27
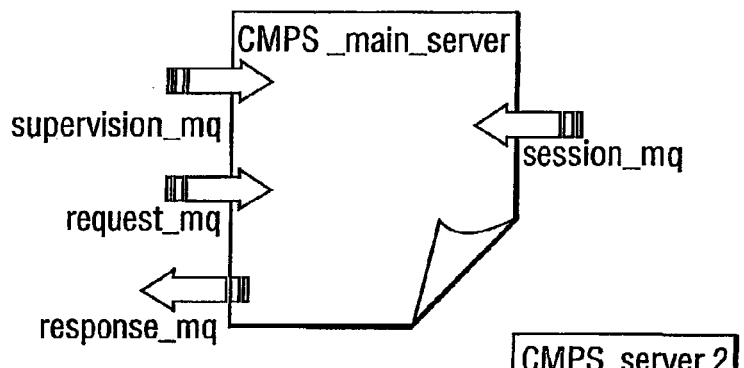
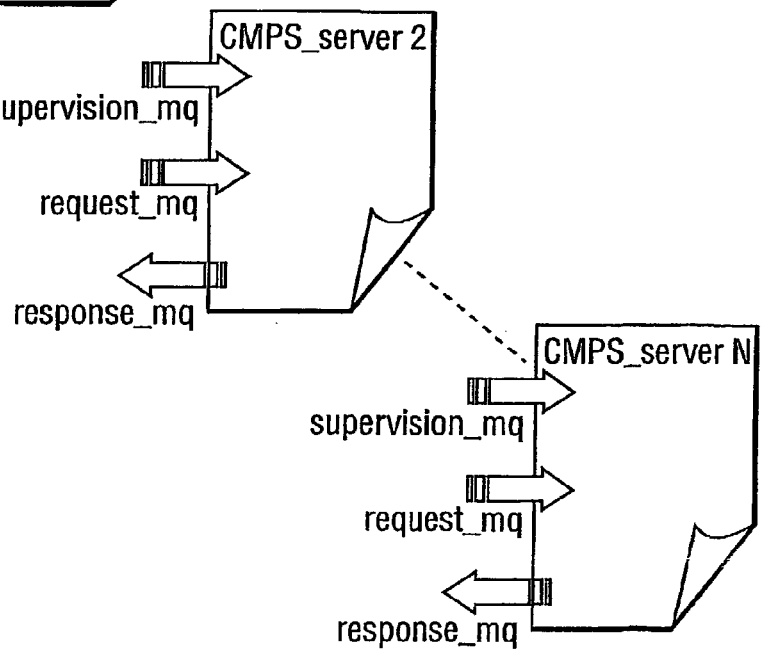

FIG. 30
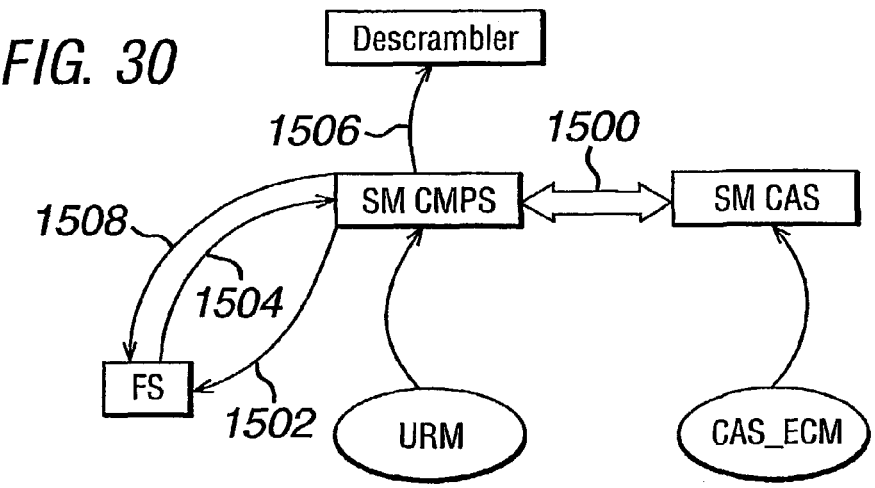
FIG. 31
| SD-CMM_Header | $E_{User\_Key}$[Content_id,SD_flag,Content_Key] | $E_{Group\_Key}$[Content_id,SD_flag, commercial_Offer,Content_Key] |
FIG. 32
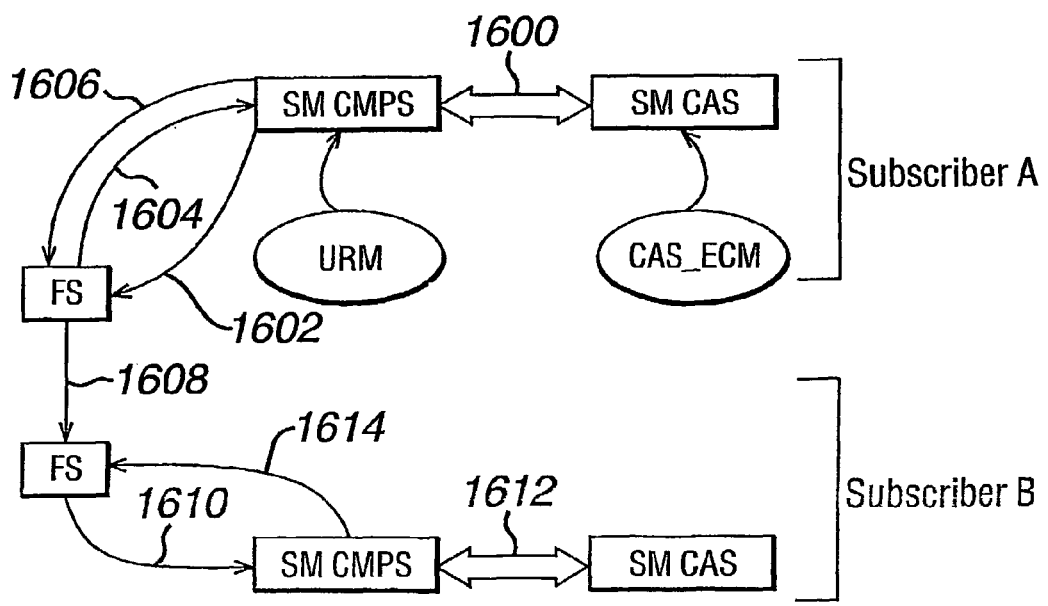

TRANSMITTING AND PROCESSING PROTECTED CONTENT

BACKGROUND OF INVENTION

Field of Invention

The present invention relates to apparatus for transmitting and receiving conditional access and content management information, apparatus for validating a request, a receiver/decoder, a broadcast centre, a broadcast system, a packet, a storage medium, methods of transmitting and receiving conditional access and content management information, and a method of validating a request.

The invention has particular application to controlling the usage of a receiver/decoder, and more particularly to providing digital rights management and content protection of programmes recorded and played back under the control of the receiver/decoder.

Transmission of encrypted data is well-known in the field of pay TV systems, where scrambled audiovisual information is broadcast typically by satellite to a number of subscribers, each subscriber possessing receiver/decoder capable of descrambling the transmitted programme for subsequent viewing. Examples of receiver/decoders include "set-top boxes", where a decoder functions in combination with a physically separate receiver, and may be include additional features, such as a web browser, a video recorder, or a television.

In a typical pay TV system, scrambled digital data is transmitted together with a control word, for descrambling of the digital data, the control word itself being encrypted by an exploitation key and transmitted in encrypted form, the scrambled digital data and encrypted control word being received by a receiver/decoder possessing an equivalent of the exploitation key necessary to decrypt the encrypted control word and thereafter descramble the transmitted data, and the receiver/decoder being further adapted to pass the digital data in its still scrambled form to a digital recording device. A paid-up subscriber will receive on a monthly basis an equivalent of the exploitation key necessary to decrypt the encrypted control word so as to permit viewing of a particular program.

With the advent of digital technology, the quality of the transmitted data has increased many times over. A particular problem associated with digital quality data lies in its ease of reproduction. Where a descrambled programme is passed via an analogue link (e.g. the "Peritel" link) for viewing and recording by a standard VCR the quality remains no greater than that associated with a standard analogue cassette recording. The risk that such a recording may be used as a master tape to make pirate copies is thus no greater than with a standard shop-bought analogue cassette.

By way of contrast, any descrambled digital data passed by a direct digital link to one of the new generation of digital recording devices (for example, a DVHS recorder) will be of the same quality as the originally transmitted programme and may thus be reproduced any number of times without any degradation of image or sound quality. There is therefore a considerable risk that the descrambled data will be used as a master recording to make pirate copies, either further digital copies or even simple analogue VHS copies.

French Patent Application No. 95 03859 in the name of Canal+ Societe Anonyme, the subject matter of which is incorporated herein by reference, discloses a system which addresses this problem. In this system, a digital recorder receives from a receiver/decoder and stores internally programme data in scrambled, rather than clear, form, and correspondingly transmits the programme back to the receiver/decoder in scrambled form during the playback of the programme. Thus unscrambled programme data is neither passed via a link between the receiver/decoder and the digital recorder, nor stored in the digital recorder itself; reducing the risk of piracy. The receiver/decoder, or a security device attached to the receiver/decoder, is then responsible for the unscrambling and, where required, the scrambling of the data passing between the receiver/decoder and the video recorder.

To allow the recorded content to be viewed after an arbitrary length of time, the control words for descrambling the content are re-encrypted with a local exploitation key prior to the storage of the scrambled content—including the re-encrypted control words—in the digital recorder. Thus, the recorded content can be viewed even after a (non-local) exploitation key originally used to encrypt the control words has been changed.

The present invention seeks to remedy problems encountered with the above prior art.

SUMMARY OF INVENTION

Accordingly, a method is provided of transmitting data, comprising transmitting conditional access information and content management information independently. Consequently, greater versatility is afforded.

Furthermore, by separating the conditional access information from the content management information it can be made easier to divide responsibility for the different types of information between different parties.

The content management information is preferably transmitted at least partially at a different time from the conditional access information, and may be transmitted at least partially from a different origin. In particular, the content management information and conditional access information are preferably transmitted in the form of separate packets.

The term "packet" as used herein preferably connotes a self-contained unit of data embodied in an arbitrary form, such as a series of values stored in a computer memory, or as an electrical signal traversing a network. An IP datagram would be a typical example of a packet.

The content management information preferably comprises rules for the usage of content. In general, such rules preferably contain legal or commercial criteria concerning access to content, including, for example, some, all or any of limits on the number and type of copies of the recording which can be made, "trick mode" restrictions on fast-forwarding, time-shifting restrictions, moral ratings, and various data relating to distribution modes, such as super-distribution flags. The rules may also specify the price of content associated with different consumption modes (such as pay-per-play, rentals, and so on) by specifying a currency and an amount, or a required number of tokens, in an electronic wallet; the rules may be complex, for example stating that one free preview is offered upon subscription to a particular service, or that discounts may be offered on a programme according to the end-user's consumption history. Content management information may further include information concerning micropayment schemes associated with transactions, such as pay-per-view, for example. Such micropayment schemes may result from a contract between content providers and technology providers.

A Usage Rules Message (UM is a particular example of content management information. It may be unique to a programme or other unit ofcontent, or associated with specific parts of such a programme or unit (similar to chapters in a DVD, for example). In that regard, URMs are not necessarily associated with specific cryptoperiods, in contrast to most conditional access information.

By contrast, as used herein, the term "conditional access information" preferably connotes information relating to or used by a conditional access system, such as Entitlement Management Messages (EMMs) and Entitlement Control Messages (ECMs). The term "Entitlement Management Message" ("EMM") preferably connotes a message for the management of subscribers or subscribers' viewing, recording or playback rights, and may cover, for example, both conventional EMMs and CMP_EMMs described below.

The content management information is preferably transmitted by a content provider, which can thus simplify the distribution of the content management information.

The term "content provider" as used herein preferably connotes any entity which produces content, makes content available for distribution, or both. An example of a content provider might be a television studio, for example, producing content in the form of television programmes. The term may refer to the commercial or legal entity associated with the content, but preferably refers to an apparatus at which the content is made available.

The content management information is preferably transmitted via a broadcast centre, which can allow advantage to be taken of existing means for transmission of data. Both of the types of information may in fact be transmitted via any means, such as a telephone connection or internet or other network connection, or as part of a satellite, cable or other broadcast. The broadcast centre could be, for example, the head-end of a cable television network, or the network operating centre of a satellite television transmission system.

The method preferably further comprises transmitting content, the conditional access information being for conditioning access to the content, and the content management information being for managing the content. By transmitting content, a context is provided both for the conditional access information and the content management information, and the management of the content may be carried out more efficiently.

The term "content" as used herein preferably connotes any information which can be tangibly embodied, in contrast to the specific form of such an embodiment. Examples of content include audio/visual data, interactive data, computer programs, data associated with particular computer programs, and other types of data. The term "audio/visual data" as used herein preferably connotes audio data, visual data, or a combination of the two, such as in a conventional television broadcast.

The content is preferably transmitted independently of the content management information, and may alternatively or additionally be transmitted independently of the conditional access information. This can afford greater flexibility for the transmission of the different types of information.

The content management information preferably comprises at least one reference to conditional access information. This can more easily allow related content management information and conditional access information to be cross-referenced, and can allow the conditional access information and content management information to be bound to the same portion of content. The reference is preferably in the form of a content identifier, and preferably a session number.

The method preferably further comprises encrypting the content management information so that the security of the system can be improved. For the same reason, the conditional access information is preferably also encrypted. The content management information may be encrypted using a different exploitation key from that used to encrypt the conditional access information, and may be encrypted using a different encryption algorithm resulting in further improvements in security.

The transmitted content management information may comprise a device identifier specifying at least one device for which the content management information is intended, which can allow a more selective transmission of the content management information.

The content management information may be generated in dependence on the device identifier, and the device identifier is preferably associated with at least one subscriber. The method may further comprise receiving an instruction from the subscriber and generating the content management information in dependence on the instruction. Such an instruction may, for example, comprise an impulse purchase or pay-per-view request. Greater flexibility can be afforded by being able to generate different content management information for different devices.

The method preferably further comprises receiving the conditional access information, receiving the content management information, and combining the received conditional access information and content management information into a combined data unit. The method preferably further comprises decrypting part or all of the received conditional access information and content management information before combining them. By combining the received conditional access information and content management information into a combined data unit, such information can more efficiently be provided when required. As used herein, the term "receiving data" and like terms may connote filtering of data, but may also more broadly connote taking data from any external source with a view for example merely to storing it without manipulating it in any way.

This important feature is also provided independently. Accordingly, in another aspect of the invention there is provided a method of receiving data, comprising receiving conditional access information, receiving content management information, and combining the received conditional access information and content management information into a combined data unit. Such a combined data unit would correspond to a Content Management Message (CMM), for example.

The method preferably further comprises storing the combined data unit, the advantage being that, by storing the combined data unit, more efficiency can be gained by subsequently being able to reuse the combined data unit.

The method preferably further comprises receiving content, the conditional access information being for conditioning access to the content, and the content management information being for managing the content. The content is typically received in scrambled form.

Much as with the transmission of content, by receiving content, a context is provided both for the conditional access information and the content management information, and the management of the content may be carried out more efficiently.

The method preferably further comprises storing the content independently to the combined data unit. The content and the combined data unit are preferably (nonetheless) both stored on a common storage medium. To be stored independently, the content and the combined data unit are preferably both stored in different files, preferably in different areas of the storage medium, or may be stored in two distinct and non-overlapping portions of the same file. By storing the content and the combined data unit independently, rather than storing them together, storage of and access to the content and combined data unit can be simplified, particularly as the content may, for example, be received and stored without requiring any intermediate modification.

The term "storing independently" as used herein, particularly with reference to the storage of data, preferably connotes storing data independently at a logical level, for example, by storing the data in different files on a hard disk. Thus, two files which are stored in a fragmented and mutually interleaved form at the physical level are nevertheless considered to be stored independently. The term may also extend, however, to physically separate storage as well.

The method preferably further comprises storing a locator which associates the combined data unit with a portion of the content. The locator may be a time stamp, or alternatively the locator may be an address. By associating the combined data unit with a portion of the content, the combined data unit can more easily be processed in synchronisation with the corresponding conditional access information relating to the portion of the content.

If at least part of the content corresponds to a cryptoperiod, then the method preferably further comprises re-encrypting the content, the size of the cryptoperiod preferably changing after the content is re-encrypted. In that case, the size of the cryptoperiod preferably increases, but may also decrease. By changing the size of the cryptoperiod, the amount of descrambling data, for instance control words, requiring encryption and decryption for a given content can be altered, and the amount of processing required to process the content can therefore be more easily adjusted.

The phrase "cryptoperiod" as used herein is typically used in relation to systems employing an encryption system with dynamic descrambling or decryption keys and preferably connotes, where appropriate, a period of time or corresponding amount of data during which such a descrambling or decryption key remains static. Such a cryptoperiod is generally of the order of seconds or tens of seconds, the descrambling key typically being conveyed in an Entitlement Control Message (ECM).

The method preferably further comprises encrypting the combined data unit with an encryption key, the encryption key preferably being associated with a device, subscriber, commercial offer, or content. An example of an encryption key associated with a device would be a 'local' key, which would not vary with time and would not typically be known to or used by any other devices.

By encrypting the combined data unit, the two items of potentially sensitive data (the conditional access information and content management information) can be more securely combined, and less overhead can be required as only one encryption needs to be performed instead of two.

An equivalent of the encryption key is preferably stored in a removable security module, and is preferably stored in a smartcard. By storing an equivalent of the key in a removable security module, the key can be used more flexibly and in a wider range of situations.

The method may further comprise causing the encryption key to expire. This adds a further level of security to the system. The method may further comprise receiving a replacement encryption key equivalent, and replacing the encryption key equivalent with the replacement encryption key equivalent. The method may also comprise receiving an instruction to cease using the encryption key equivalent, and may also comprise ceasing using an encryption key equivalent after the expiry of a set of access rights.

The term "expire" as used herein preferably connotes ceasing to function in an intended capacity, either voluntarily or involuntarily.

The method may further comprise creating a further data unit comprising the equivalent of the encryption key, and encrypting the further data unit with a further encryption unit, the further encryption key preferably being associated with a device, subscriber, commercial offer, or content. The method preferably further comprises storing the further data unit. By means of the further data unit, the equivalent of the encryption key can be made available to another party having the appropriate device, subscriber, commercial offer or content key.

The method preferably further comprises distributing to another party the combined data unit and further data unit, and preferably the content. This can allow a 'super-distribution' model to be implemented. Measures such as passing on the encryption key in encrypted form, in the form of the above further data unit, for example, can ensure the continued protection and rights management of the 'super-distributed' content.

On the basis that the combined data unit relates to a given time, the step of combining the conditional access information and content management information may further comprise storing in the combined data unit a timing value related to the given time, whereby the timing value can subsequently be used to enforce time-shifting restrictions. The timing value may be a counter, related to a number of elapsed cryptoperiods, but may also be an actual time.

With reference to the following paragraph, the term "receiver/decoder" used herein may connote a receiver for receiving either encoded or non-encoded signals, for example, television and/or radio signals, which may be broadcast or transmitted by some other means. The term may also connote a decoder for decoding received signals. Embodiments of such receiver/decoders may include a decoder integral with the receiver for decoding the received signals, for example, in a "set-top box", such a decoder functioning in combination with a physically separate receiver, or such a decoder including additional functions, such as a web browser, game playing facilities, a video recorder, or a television. A further example would be a personal computer (PC) capable of receiving encoded or non-encoded signals, via the internet, for example.

The method preferably further comprises receiving a request to use the content, receiving the combined data unit, extracting the conditional access information and content management information from the combined data unit, and validating the request in dependence on the conditional access information and the content management information. The request to use the content preferably comprises a request to retrieve the content from a storage medium, decrypt the content, provide descrambling data, for instance a control word, to descramble the content, and/or output the content. Such a request could be generated by a receiver/decoder under the control of a user attempting to view a recording, for example. The request to use the content may also comprise a request to store the content and/or encrypt the content. Such a request could be generated, for example, by a receiver/decoder under the control of a user attempting to record content. By validating the request in dependence on the conditional access information and the content management information, a versatile content management and protection system can be provided.

The important feature is also provided independently. Accordingly, in a further aspect of the invention there is provided a method of validating a request to use content, comprising receiving a request to use the content, receiving a combined data unit comprising conditional access information and content management information, extracting the conditional access information and content management information from the combined data unit, and validating the request in dependence on the conditional access information and the content management information.

The method preferably further comprises extracting descrambling data, for instance a control word, from the conditional access data for descrambling at least part of the content, and outputting the descrambling data. By outputting descrambling data for descrambling at least part of the content, in addition to validating the request to use the content, a more coherent content and protection system can be provided.

If the method further comprises reproducing a portion of the content, the method may then further comprise buffering descrambling data, for instance a control word. This can reduce the time taken to jump to different portions of the content whose corresponding descrambling data has been buffered.

The step of reproducing a portion of the content preferably further comprises maintaining a current position locator, the current position locator corresponding to a current cryptoperiod, and outputting the portion of the content corresponding to the current position locator, in which case the step of buffering descrambling data preferably further comprises obtaining descrambling data, for instance a control word, corresponding to a cryptoperiod which is different to the current cryptoperiod. In this fashion, the ability can be provided to jump quickly between different cryptoperiods without having to wait for the appropriate descrambling data to be decrypted.

The method further comprises obtaining descrambling data, for instance a control word, corresponding to the current position within the content, obtaining further descrambling data, for instance a further control word, corresponding to at least one different position within the content, and storing the further descrambling data.

The method may further comprise modifying the combined data unit, and storing the new combined data unit. The flexibility of the system can thus be increased, allowing a more dynamic use of the content management information or conditional access information. One such use would be to have usage rules which allow only a limited number of viewings of a particular recording, the number of recordings left before the rights expire being encoded in the CMMs and updated at playback.

The modification is preferably in accordance with a prevailing content usage mode. Thus account can be taken of different usage modes such as subscription modes and pay-per-play modes.

The content management information is preferably received at a receiver/decoder.

In a further aspect of the invention, there is provided apparatus for transmitting data, comprising means (preferably in the form of at least one emitter and its associated controller or processor) for transmitting conditional access information and content management information independently.

The apparatus is preferably associated with a programe provider, and may be incorporated in a system for the provision of programmes.

The apparatus preferably further comprises means (preferably in the form of at least one emitter and its associated controller or processor) for transmitting the content management information via a broadcast centre.

The apparatus may further comprise means (typically in the form of at least one emitter and its associated controller or processor) for transmitting content. The means for transmitting content management information and the means for transmitting content are preferably adapted to transmit independently.

The apparatus preferably further comprises means (typically in the form of a processor) for inserting in the content management information at least one reference to corresponding conditional access information.

The apparatus may further comprise means (typically in the form of a processor) for encrypting the content management information and preferably also comprises means (typically in the form of the same or a separate processor) for encrypting the conditional access information.

The apparatus preferably further comprises means (typically in the form of a processor) for inserting in the content management information a device identifier specifying at least one device for which the content management information is intended.

The apparatus may comprise means (typically in the form of a processor) for generating content management information. The means for generating content management information may further comprise means (typically in the form of a processor) for generating content management information in dependence on the device identifier, and may further comprise means (typically in the form of a processor) for generating the content management information in dependence on an instruction received from a subscriber.

In a yet further aspect of the invention, there is provided apparatus for receiving data, comprising means (typically in the form of a receiver) for receiving conditional access information, means (typically in the form of the same or a separate receiver) for receiving content management information, and means (typically in the form of a processor) for combining the received conditional access information and content management information into a combined data unit.

The apparatus for receiving data preferably comprises means (typically in the form of a storage medium) for storing the combined data unit. The apparatus preferably also comprises means (typically in the form of a receiver) for receiving content.

The means for storing the combined data unit is preferably further adapted to store the content, and is preferably further adapted to store the content independently of the combined data unit.

The apparatus preferably further comprises means (typically in the form of a timer and/or a processor) for generating a locator which associates the combined data unit with a portion of the content, and the means for storing the combined data unit is preferably further adapted to store the locator.

The apparatus preferably further comprises means (typically in the form of a processor) for re-encrypting the content, means (typically in the form of the same or a different processor) for encrypting the combined data unit with an encryption key, and means (typically in the form of a memory and/or removable security module) for storing an equivalent of the encryption key.

The apparatus may further comprise means (typically in the form of a processor) for causing the encryption key to expire, the means for causing the encryption key to expire preferably comprising means (typically in the form of a receiver) for receiving a request to expire the encryption key, and means (typically in the form of the same or a different processor) for processing the request to expire the encryption key.

The apparatus preferably further comprises means (typically in the form of a processor) for creating a further data unit comprising an equivalent of the encryption key, and means (typically in the form of the same or a different processor) for encrypting the further data unit with a further encryption key.

The apparatus preferably further comprises means (typically in the form of a processor and/or network interface) for distributing the combined data unit, further data unit and preferably the content.

The apparatus preferably further comprises means (typically in the form of a timer or processor) for generating a timing value related to a given time to which the combined data unit relates.

The apparatus may further comprise means (typically in the form of an input) for receiving a request to use the content, means (typically in the form of a receiver) for receiving the combined data unit, means (typically in the form of a processor) for extracting the conditional access information and content management information from the combined data unit, and means (typically in the form of the same or a separate processor) for validating the request in dependence on the conditional access information and the content management information.

The apparatus preferably further comprises means (typically in the form of a processor) for extracting descrambling data, for instance a control word, for descrambling at least part of the content from the conditional access data, and means (typically in the form of an output) for outputting the descrambling data.

The apparatus for receiving data preferably further comprises means (typically in the form of a processor and/or output) for reproducing the content, and may further comprise means (typically in the form of a memory and/or processor) for buffering descrambling data, for instance a control word.

The means for buffering descrambling data preferably comprises means (typically in the form of a processor) for obtaining descrambling data corresponding to the current position within the content, means (typically in the form of the same or a separate processor) for obtaining further descrambling data corresponding to at least one different position within the content, and means (typically in the form of a memory) for storing the further descrambling data.

The apparatus for receiving data may further comprise means (typically in the form of a processor) for modifying the combined data unit, and means (typically in the form of a memory) for storing the new combined data unit. The means for modifying the combined data unit preferably comprises means for modifying the combined data unit in accordance with a prevailing content usage mode.

In another aspect of the invention, there is provided apparatus for validating a request to use a content, comprising means (typically in the form of a receiver or processor) for receiving a request to use the content, means (typically in the form of a receiver) for receiving a combined data unit comprising conditional access information and content management information, means (typically in the form of the same or a separate processor) for extracting the conditional access information and content management information from the combined data unit, and means (typically in the form of a processor) for validating the request in dependence on the conditional access information and the content management information.

The apparatus for validating a request to use content preferably further comprises means (typically in the form of a processor) for extracting descrambling data, for instance a control word, for descrambling at least part of the content from the conditional access data, and means (typically in the form of an output) for outputting the descrambling data.

The apparatus preferably further comprises means (typically in the form of a processor and/or output) for reproducing the content, and may further comprise means (typically in the form of a memory and/or processor) for buffering descrambling data.

The means for buffering descrambling data preferably comprises means (typically in the form of a processor) for obtaining descrambling data, for instance a control word, corresponding to the current position within the content, means (typically in the form of the same or a separate processor) for obtaining further descrambling data, for instance a further control word, corresponding to at least one different position within the content, and means (typically in the form of a memory) for storing the further descrambling data.

The apparatus may further comprise means (typically in the form of a processor) for modifying the combined data unit, and means (typically in the form of a memory) for storing the new combined data unit. The means for modifying the combined data unit preferably comprises means for modifying the combined data unit in accordance with a prevailing content usage mode.

The apparatus for validating a request to use content is preferably incorporated within a receiver/decoder, and may alternatively be incorporated within a storage device.

In a further aspect of the invention, there is provided a storage medium having stored thereon conditional access information and content management information as a combined data unit.

In another aspect of the invention, there is provided a receiver/decoder incorporating apparatus for receiving data as aforesaid, and preferably further incorporating apparatus for validating data also as aforesaid. The receiver/decoder may further incorporate a storage medium as aforesaid.

In a further aspect of the invention, there is provided a packet comprising an Entitlement Management Message containing an identifier enabling it to be directed to a content management system.

In a yet further aspect of the invention, there is provided a packet consisting of content management information.

In another aspect of the invention, there is provided a packet consisting of content management information, conditional access information and entitlement management information.

In a further aspect of the invention, there is provided a broadcast centre incorporating apparatus for transmitting as aforesaid.

In a yet further aspect of the invention, there is provided a broadcast system incorporating a receiver/decoder as aforesaid, and preferably the broadcast centre also as aforesaid.

In a further aspect of the invention, there is provided apparatus comprising means for extracting decryption keys from an encrypted audiovisual datastream and means for recording and storing an encrypted audiovisual datastream and its corresponding decryption keys separately.

The advantage of storing the datastream in this way is that the encoded datastreams are compressed and therefore take up less space on storage media than decoded and uncompressed datastreams. Storing encoded data also helps prevent piracy of the stored data. Storing the decoding keys separately contributes to the security of the stored data.

The terms "scrambled" and "encrypted" and "control word" and "key" have been used here for the purpose of clarity of language. However, it will be understood that no fundamental distinction is to be made between "scrambled data" and "encrypted data" or between a "control word" and a "key".

Preferably, the stored audiovisual datastream comprises scrambled video and or audio data, and the decryption keys comprise descrambling data for use in descrambling the scrambled video and or audio data.

Preferably, the apparatus comprises means for recombining and synchronising the stored decryption keys and the encoded audiovisual datastream during playback.

In order to be able to play the recorded datastream, the decryption keys need to be recombined with the datastream in the correct order for the correct key to be synchronised with its corresponding piece of the datastream.

Preferably, there is provided storage means for storing combined and synchronised keys and audiovisual datastream.

The invention also provides a method substantially as described herein with reference to FIGS. 1 to 11 and 14 to 34 of the accompanying drawings, and apparatus substantially as described herein with reference to and as illustrated in the accompanying drawings.

The invention further provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

The invention also provides a storage medium having stored thereon conditional access information and content management information as a combined data unit The invention also provides a broadcast system adapted to perform any of the methods described herein.

Any feature in one aspect of the invention may be applied to other aspects of the invention, in any appropriate combination.

Preferred features of the present invention will now be described, purely by way of example, with reference to the accompanying drawings, in which:—

BRIEF DESCRIPTION OF THE DRAWINGS

FIG. 23 is an illustration of the structure of the levels of services, mechanisms and API;

FIG. 24 is an illustration of the different stages involved in playing back a recording;

FIG. 25 is an illustration of the different stages involved in playing back a recording in a different aspect;

FIG. 26 is an illustration of the different stages involved in playing back a recording in a further aspect;

FIG. 27 is an illustration of the principle of creating new instances of the server;

FIG. 30 is a schematic illustration of the different stages of creation of the CMM in the personalisation mode;

FIG. 31 is an illustration of the structure of a CMM specific to super distribution (SD-CMM) and associated exclusively with a content;

FIG. 32 is a schematic illustration of the different stages of creation and modification of the SD-CMM in the super-distribution mode;

DETAILED DESCRIPTION

System Overview

Figure 1:
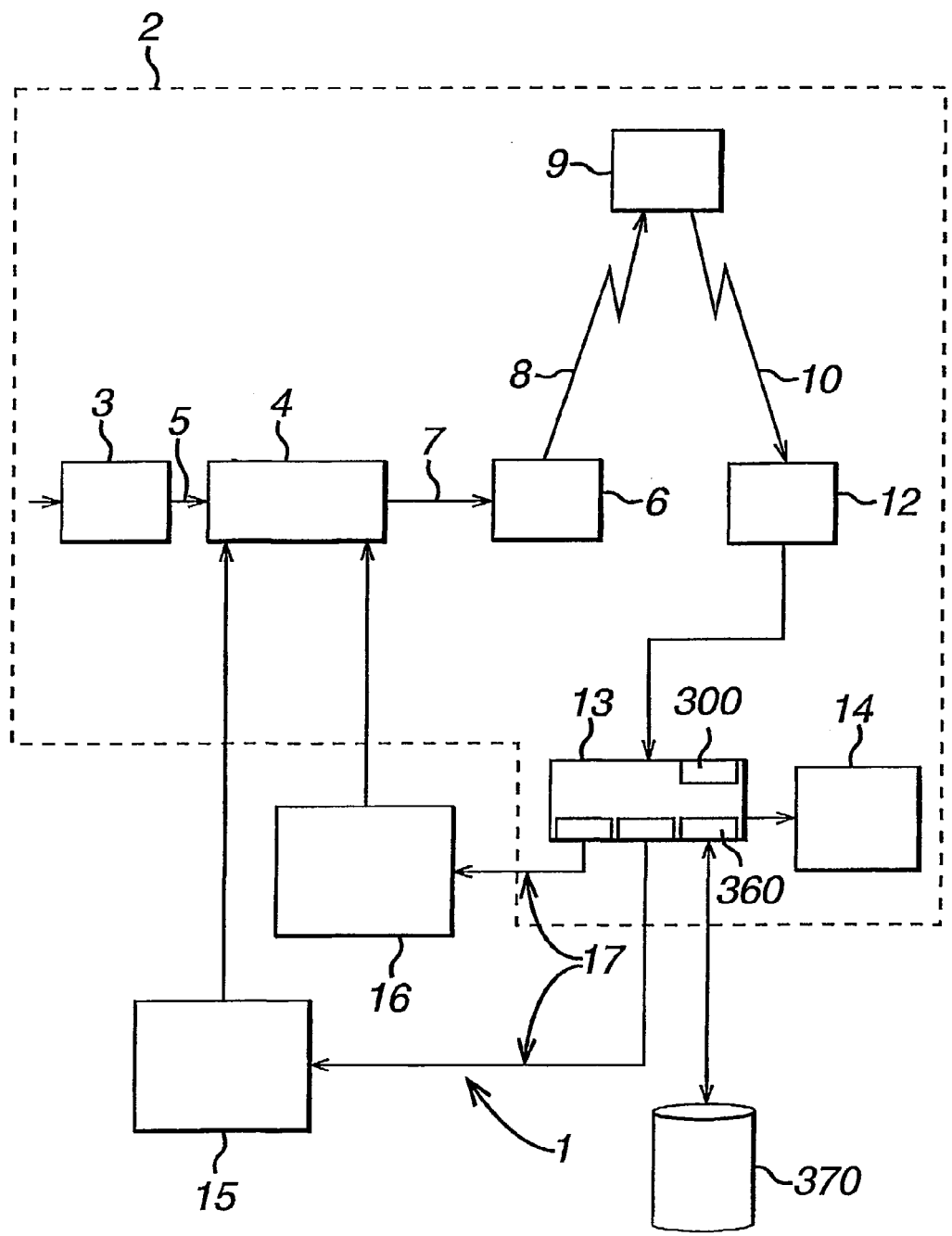
FIG. 1 is an overview of a typical digital television system.

An overview of a digital television system 1 is shown in FIG. 1. A brief description of the important aspects of the system now follows.

The system includes a mostly conventional digital television system 2 that uses the known MPEG-2 compression system to transmit compressed digital signals. In more detail MPEG-2 compressor 3 in a broadcast centre receives a digital signal stream (typically a stream of video signals). The compressor 3 is connected to a multiplexer and scrambler 4 by linkage 5.

The multiplexer 4 receives a plurality of further input signals, assembles the transport stream and transmits compressed digital signals to a transmitter 6 of the broadcast centre via linkage 7, which can of course take a wide variety of forms including telecommunications links. The transmitter 6 transmits electromagnetic signals via uplink 8 towards a satellite transponder 9, where they are electronically processed and broadcast via notional downlink 10 to earth receiver 12, conventionally in the form of a dish owned or rented by the end user. Other transport channels for transmission of the data are of course possible, such as terrestrial broadcast, cable transmission, combined satellite/cable links, telephone networks etc.

The signals received by receiver 12 are transmitted to an integrated receiver/decoder 13 owned or rented by the end user and connected to the end user's television set 14. The receiver/decoder 13 decodes the compressed MPEG-2 signal into a television signal for the television set 14. Although a separate receiver/decoder is shown in FIG. 1, the receiver/decoder may also be part of an integrated digital television. As used herein, the term "receiver/decoder" includes a separate receiver/decoder, such as a set-top box, and a television having a receiver/decoder integrated therewith.

In a multichannel system the multiplexer 4 handles audio and video information received from a number of parallel sources and interacts with the transmitter 6 to broadcast the information along a corresponding number of channels. In addition to audiovisual information, messages or applications or any other sort of digital data may be introduced in some or all of these channels interlaced with the transmitted digital audio and video information.

A conditional access system 15 is connected to the multiplexer 4 and the receiver/decoder 13, and is located partly in the broadcast centre and partly in the receiver/decoder. It enables the end user to access digital television broadcasts from one or more broadcast suppliers. A smartcard, capable of deciphering messages relating to commercial offers (that is, one or several television programmes sold by the broadcast supplier), can be inserted into the receiver/decoder 13. Using the receiver/decoder 13 and smartcard, the end user may purchase commercial offers in either a subscription mode or a pay-per-view mode.

As mentioned above, programmes transmitted by the system are scrambled at the multiplexer 4, the conditions and encryption keys applied to a given transmission being determined by the conditional access system 15. Transmission of scrambled data in this way is well known in the field of pay TV systems. Typically, scrambled data is transmitted together with a control word for descrambling of the data, the descrambling data itself being encrypted by a so-called exploitation key and transmitted in encrypted form.

The scrambled data and encrypted control word are then received by the receiver/decoder 13 having access to an equivalent to the exploitation key stored on a smartcard inserted in the receiver/decoder to decrypt the encrypted control word and thereafter descramble the transmitted data. A paid-up subscriber will receive, for example, in a broadcast monthly EMM (Entitlement Management Message) the exploitation key necessary to decrypt the encrypted control word so as to permit viewing of the transmission. Such an Entitlement Message may be herein referred to as a 'CAS_EMM' (by contrast to a 'CMP_EMM', generated by and for the content management and protection described below).

An interactive system 16, also connected to the multiplexer 4 and the receiver/decoder 13 and again located partly in the broadcast centre and partly in the receiver/decoder, enables the end user to interact with various applications via a back channel 17. The back channel may be, for example a Public Switched Telephone Network (PST) channel (for example, a modemmed back channel) or an Out of Band (OOB) channel. The back channel may also be used for communications used in the conditional access system 15 and/or in the content management and protection system described below.

Using a mass storage device 370 attached to the receiver/decoder, portions of the received transmission can be recorded and stored for later viewing. The mass storage device 370 can be, for example, a hard disc video recorder, DVHS recorder, DAT recorder, solid state memory unit, or other suitable medium, and may be incorporated within the receiver/decoder, or may be provided separately. The mass storage device 370 may even be static or dynamic memory within or external to the receiver/decoder. Suitable interfacing software 360 and optionally hardware is provided within the receiver/decoder.

A content management and protection system (CMPS), to manage and protect the contents of recordings stored on the mass storage device via the receiver/decoder, is distributed between the broadcast centre and the receiver/decoder. The receiver/decoder component of the CMPS is typically provided in the form of a smartcard with associated smartcard reader, but may be implemented solely in software or in alternative hardware embodiments. The CMPS can ensure that only authorized users can record and playback content, in accordance with predefined usage rules.

An important part of the content management and protection system is the special Usage Rules Message (URM) which contains content management information relating to a given programme or transmission and is transmitted before such a programme or transmission. In essence, the Usage Rules Messages impose usage constraints on the playback and reproduction of the content, and can be directed only to specific portions of the content, such as separate 'chapters' within a programme, or to the content as a whole. Typical usage rules include restrictions on time-shifting, fast-forwarding, number of times a recording can be played back, and available reproduction modes. Another important feature, which will be described in more detail below, is that URMs relating to a given programme may be sent independently (from different locations and at different times) from the corresponding content or conditional access information.

In the description which follows, the various elements of the system mentioned above will be described in more detail.

In particular, the conditional access system (including Entitlement Management Messages), the receiver/decoder (including the architecture of a receiver/decoder), and the Content Management and Protection System (including the structure of a transmission, and storing and retrieving content) will now be described in turn.

Finally, the Content Management and Protection System will then be described in a further level of detail, with particular reference to the interface with the mass storage device (including recording, playing back), the interface with the conditional access system (including recording, playing back) and the functional scenarios of the CMPS.

Conditional Access System

Figure 2:
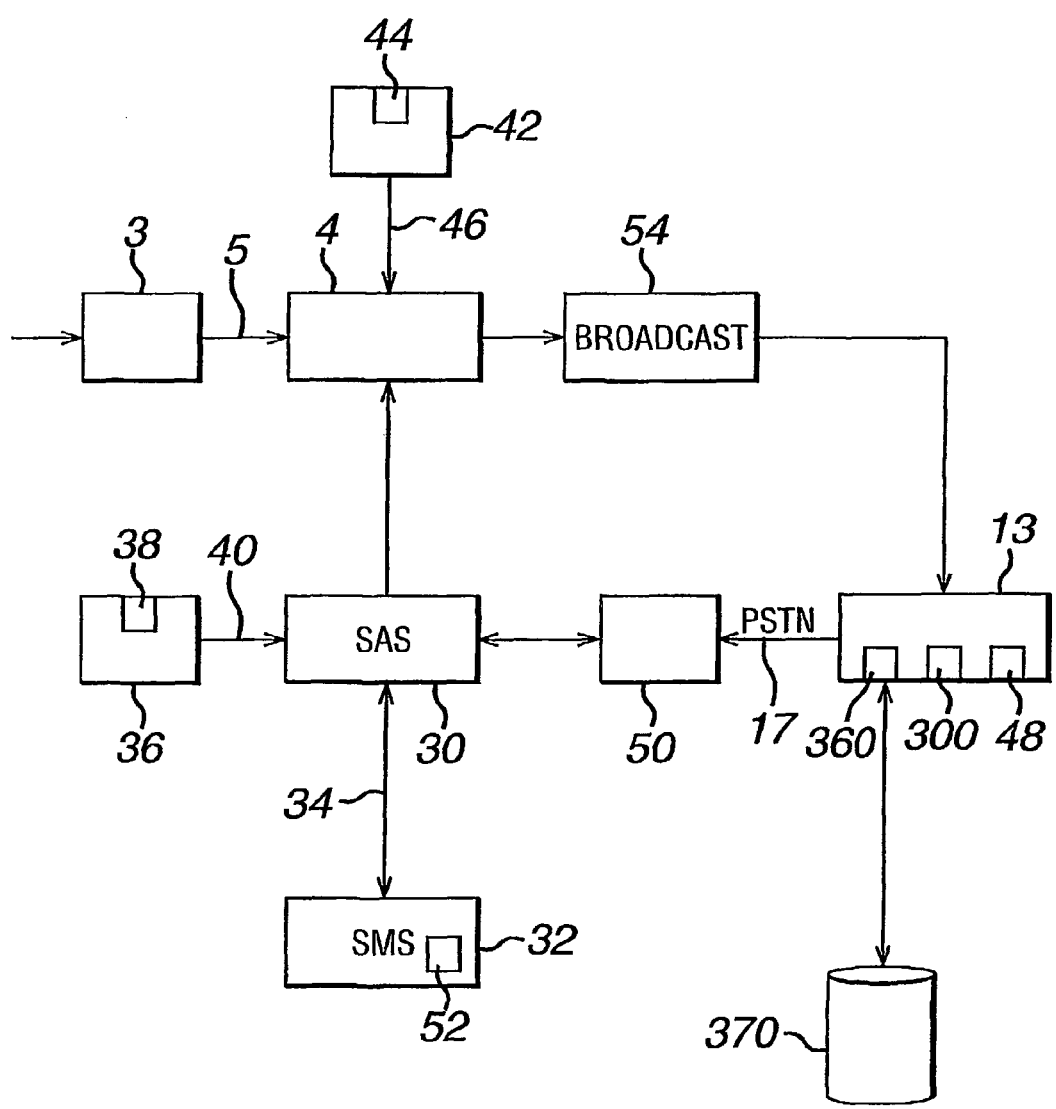
FIG. 2 is an overview of a conditional access system.

With reference to FIG. 2, in overview the conditional access system 15 includes a Subscriber Authorization System (SAS) 30. The SAS 30 is connected to one or more Subscriber Management Systems (SMS) 32, one SMS for each broadcast supplier, by a link 34, which may be a TCP-IP link or other type of link. Alternatively, one SMS could be shared between two commercial operators, or one operator could use two SMSs, and so on.

First encrypting units in the form of ciphering units 36 utilising "mother" smartcards 38 are connected to the SAS by a linkage 40. Second encrypting units again in the form of ciphering units 42 utilising mother smartcards 44 are connected to the multiplexer 4 by linkage 46. The receiver/decoder 13 receives a "daughter" smartcard 48. The receiver/decoder is connected directly to the SAS 30 via Communications Servers 50 and the modemmed back channel 17. The SAS sends amongst other things subscription rights to the daughter smartcard on request.

The smartcards contain confidential information from one or more commercial operators. The "mother" smartcard encrypts different kinds of messages and the "daughter" smartcards decrypt the messages, if they have the rights to do so.

With reference to FIG. 2, in the broadcast centre, the digital video signal is first compressed (or bit rate reduced), using the MPEG-2 compressor 3. This compressed signal is then transmitted to the multiplexer and scrambler 4 in order to be multiplexed with other data, such as other compressed data.

The scrambler generates a control word used in the scrambling process and included in the MPEG-2 stream in the multiplexer 4. The control word is generated internally and enables the end user's integrated receiver/decoder 13 to descramble the programme.

Access criteria, indicating how the programme is commercialised, are also added to the MPEG-2 stream. The programme may be commercialised in either one of a number of "subscription" modes and/or one of a number of "Pay Per View" (PPV) modes or events. In the subscription mode, the end user subscribes to one or more commercial offers, or "bouquets", thus getting the rights to watch every channel inside those bouquets. In the Pay Per View mode, the end user is provided with the capability to purchase events as he wishes.

Both the control word and the access criteria are used to build an Entitlement Control Message (ECM); this is a message sent in relation with one scrambled program; the message contains a control word (which allows for the descrambling of the program) and the access criteria of the broadcast program. The access criteria and control word are transmitted to the second encrypting unit 42 via the linkage 46. In this unit, an ECM is generated, encrypted and transmitted on to the multiplexer and scrambler 4.

Each service broadcast by a broadcast supplier in a data stream comprises a number of distinct components; for example a television programme includes a video component, an audio component, a sub-title component and so on. Each of these components of a service is individually scrambled and encrypted for subsequent broadcast. In respect of each scrambled component of the service, a separate ECM is required.

The multiplexer 4 receives electrical signals comprising encrypted EMMs from the SAS 30, encrypted ECMs from the second encrypting unit 42 and compressed programmes from the compressor 3. The multiplexer 4 scrambles the programmes and transmits the scrambled programmes, the encrypted EMMs and the encrypted ECMs as electric signals to broadcast system 54, which may be for example a satellite system as shown in FIG. 1, or other broadcast system. The receiver/decoder 13 demultiplexes the signals to obtain scrambled programmes with encrypted EMMs and encrypted ECMs.

The receiver/decoder receives the broadcast signal and extracts the MPEG-2 data stream. If a programme is scrambled, the receiver/decoder 13 extracts the corresponding ECM from the MPEG-2 stream and passes the ECM to the "daughter" smartcard 48 of the end user. This slots into a housing in the receiver/decoder 13. The daughter smartcard 48 controls whether the end user has the right to decrypt the ECM and to access the programme. If not, a negative status is passed to the receiver/decoder 13 to indicate that the programme cannot be descrambled. If the end user does have the rights, the ECM is decrypted and the control word extracted. The decoder 13 can then descramble the programme using this control word. The MPEG-2 stream is decompressed and translated into a video signal for onward transmission to television set 14.

If the programme is not scrambled, no ECM will have been transmitted with the MPEG-2 stream and the receiver/decoder 13 decompresses the data and transforms the signal into a video signal for transmission to television set 14.

The Subscriber Management System (SMS) 30 includes a database 52 which manages, amongst others, all of the end user files, commercial offers (such as tariffs and promotions), subscriptions, PPV details, and data regarding end user consumption and authorization. The SMS may be physically remote from the SAS.

The SMS 32 transmits messages to the SAS 30 which imply modificationsto or creations of Entitlement Management Messages EMMs) to be transmitted to end users. The SMS 32 also transmits messages to the SAS 30 which imply no modifications or creations of EMMs but imply only a change in an end user's state (relating to the authorization granted to the end user when ordering products or to the amount that the end user will be charged). The SAS 30 also sends messages (typically requesting information such as call-back information or billing information) to the SMS 32, so that it will be apparent that communication between the two is two-way.

Entitlement Management Messages (EMMs)

The EMM is a message dedicated to an individual end user (subscriber), or a group of end users, only, in contrast with an ECM, which is dedicated to one scrambled programme only or a set of scrambled programmes if part of the same commercial offer. Various specific types of EMM are possible. Individual EMMs are dedicated to individual subscribers, and are typically used in the provision of Pay Per View services; these contain the group identifier and the position of the subscriber in that group. So-called "Group" subscription EMMs are dedicated to groups of say, 256 individual users, and are typically used in the administration of some subscription services. Audience EMMs are dedicated to entire audiences. An "audience" is the totality of subscribers having smartcards which bear the same Operator Identifier (OPI). Finally, a "unique" EMM is addressed to the unique identifier of the smartcard.

Figure 3:
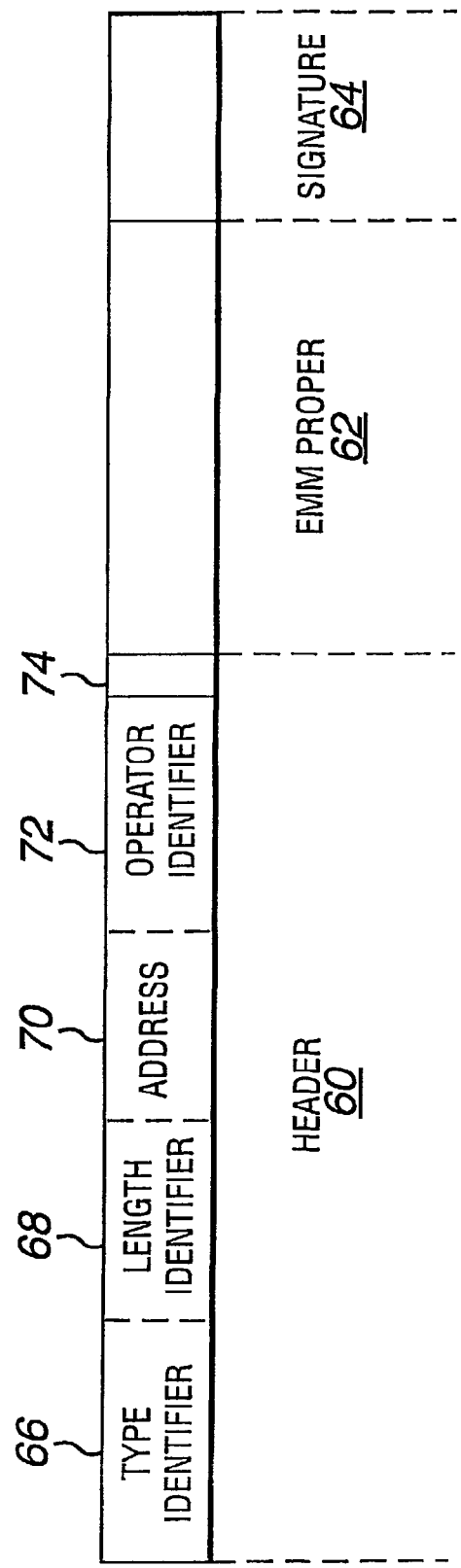
FIG. 3 is the structure of an Entitlement Management Message (EMM)

The general form of an EMM which is used in the preferred embodiments is now described with reference to FIG. 3. Basically, the EMM, which is implemented as a series of digital data bits, comprises a header 60, the EMM proper 62, and a signature 64. The header 60 in turn comprises a type identifier 66 to identify the type of EMM, a length identifier 68 which gives the length of the EMM, an optional address 70 for the EMM, an operator identifier 72 and a key identifier 74. Finally, the signature 64, which is also optional, provides a number of checks against corruption of the remaining data in the EMM. The type identifier in the header identifies the message as an EMM.

Receiver/Decoder

Figure 4:
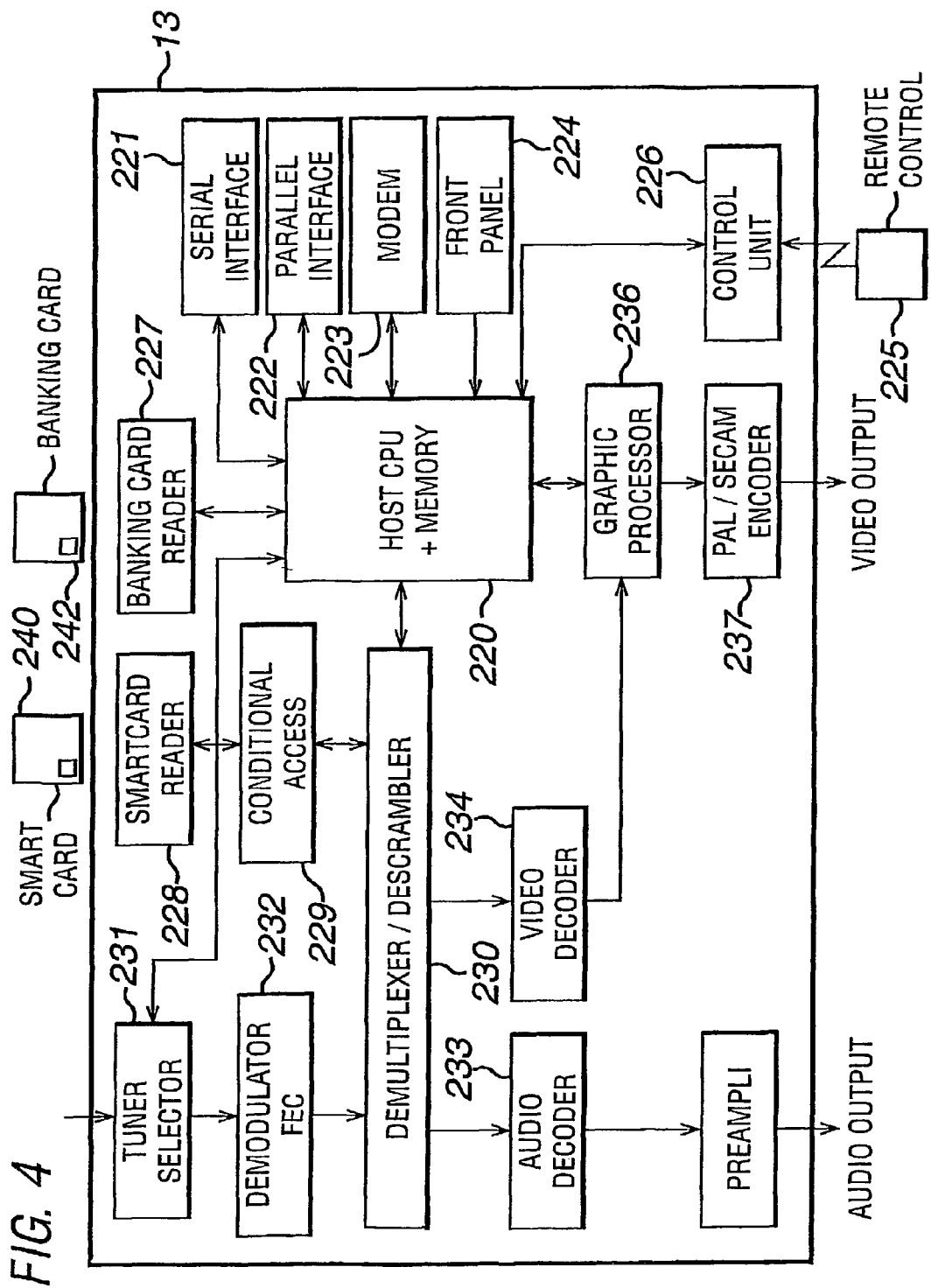
FIG. 4 is a block diagram of a receiver/decoder.

Referring to FIG. 4, the various elements of receiver/decoder 13 will now be described in terms of functional blocks.

The receiver/decoder 13, which may be, for example, a digital set-top box (DSTB), comprises a central processor 220 including associated memory elements and adapted to receive input data from a serial interface 221, a parallel interface 222, a modem 223 (connected to the modem back channel 17 of FIG. 1), and switch contacts 224 on the front panel of the decoder.

The receiver/decoder is additionally adapted to receive inputs from an infra-red remote control 225 via a control unit 226 and also possesses two smartcard readers 227, 228 adapted to read bank and subscription smartcards 242, 240 respectively. The subscription smartcard reader 228 engages with an inserted subscription card 240 and with a conditional access unit 229 to supply the necessary control word to a demultiplexer/descrambler 230 to enable the encrypted broadcast signal to be descrambled. The decoder also includes a conventional tuner 231 and demodulator 232 to receive and demodulate the satellite transmission before being filtered and demultiplexed by the unit 230.

As used in this description, an application is preferably a piece of computer code for controlling high level functions of preferably the receiver/decoder 13. For example, when the end user positions the focus of remote control 225 on a button object seen on the screen of the television set 14 and presses a validation key, the instruction sequence associated with the button is run.

An interactive application proposes menus and executes commands at the request of the end user and provides data related to the purpose of the application. Applications may be either resident applications, that is, stored in the ROM (or FLASH or other non-volatile memory) of the receiver/decoder 13, or broadcast and downloaded into the RAM or FLASH memory of the receiver/decoder 13.

Applications are stored in memory locations in the receiver/decoder 13 and represented as resource files. The resource files comprise graphic object description unit files, variables block unit files, instruction sequence files, application files and data files.

The receiver/decoder contains memory divided into a RAM volume, a FLASH volume and a ROM volume, but this physical organization is distinct from the logical organization. The memory may further be divided into memory volumes associated with the various interfaces. From one point of view, the memory can be regarded as part of the hardware; from another point of view, the memory can be regarded as supporting or containing the whole of the system shown apart from the hardware.

Architecture of a Receiver/Decoder

Figure 5:
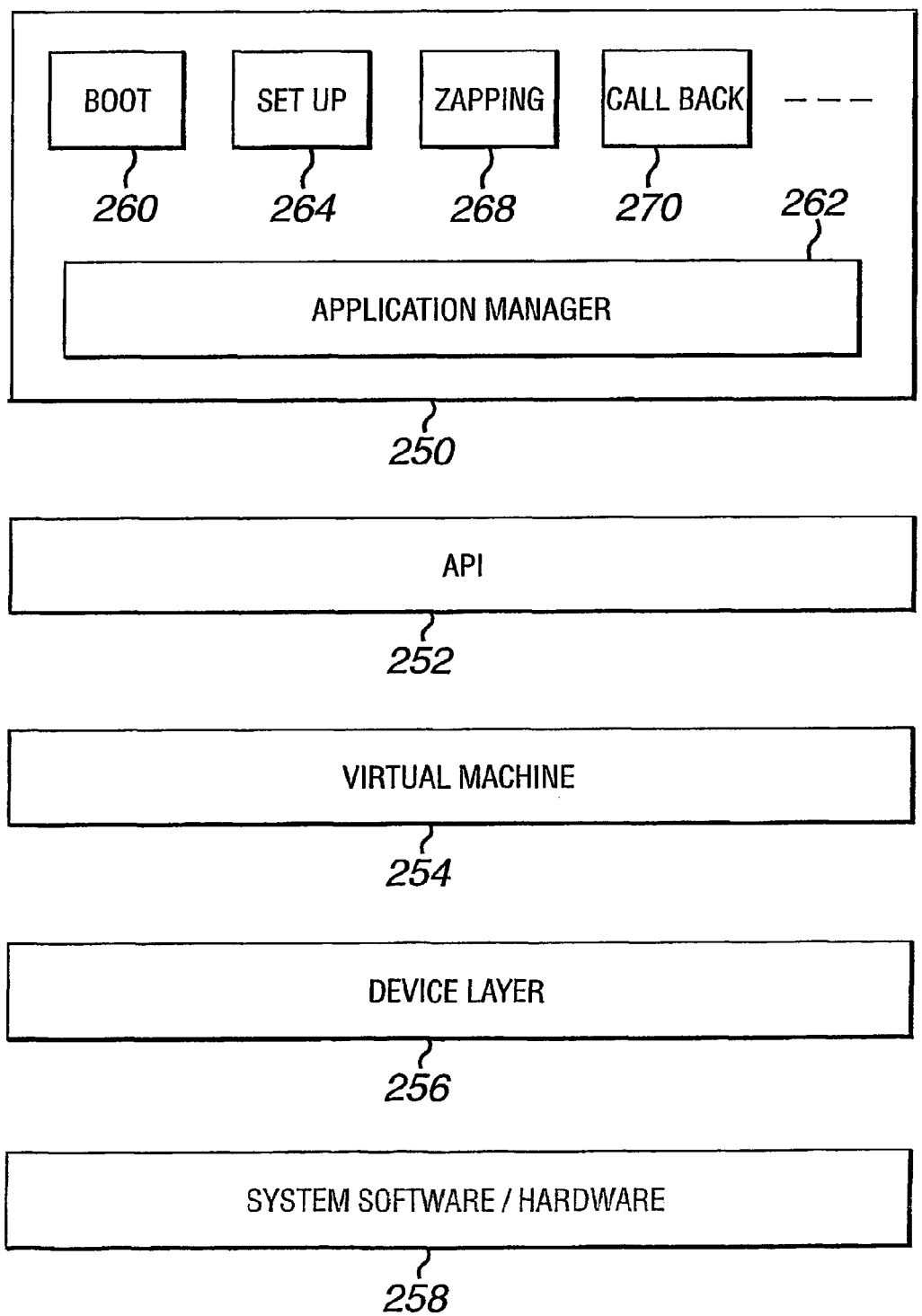
FIG. 5 is an illustration of the architecture of a receiver/decoder.

The receiver/decoder contains five software layers, organized so that the software can be implemented in any receiver/decoder and with any operating system. Referring to FIG. 5, the various software layers are Application Layer 250, Application Programming Interface (API) layer 252, Val Machine Layer 254, Device Layer 256 and System Software/Hardware Layer 258.

The Application Layer 250 encompasses applications that are either resident in or downloaded to the receiver/decoder. They may be interactive applications used by customers, written in, for example, Java, HTML, MHEG-5 or other languages, or they may be applications used by the receiver/decoder to run such applications. This layer is based on a set of open Application Programming Interfaces (APIs) provided by the Virtual Machine layer. This system allows applications to be downloaded to flash or RAM memory in the receiver/decoder on-the-fly or on demand. The application code can be transmitted in compressed or uncompressed format using protocols such as Data Storage Media Command and Control (DSMCC), Network File Server (NFS) or other protocols.

Interactive applications are applications that the user interacts with, for example, to obtain products and services, such as electronic program guides, telebanking applications and games. The following resident applications are used to manage interactive applications:

Boot. The Boot application 260 is the first application launched when the receiver/decoder is powered on. The Boot application starts the different "Managers" in the Virtual Machine, the first being the Application Manager 262.

Application Manager. The Application Manager 262 manages the interactive applications that are run in the receiver/decoder, that is, it starts, stops, suspends, resumes, handles events and deals with communication between applications. It allows multiple applications to run at once, and thus is involved in the allocation of resources among them. This application is completely transparent to the user.

SetUp. The purpose of the SetUp application 264 is to configure the receiver/decoder, primarily the first time it is used. It performs actions such as scanning for TV channels, setting the date and time, establishing user preferences, and so on. However, the SetUp application can be used at any time by the user to change the receiver/decoder configuration.

Zapping. The Zapping application 268 is used to change channels using the Program-up, Program-down and numeric keys. When another form of zapping is used, for example, through a banner (pilot) application, the Zapping application is stopped.

Callback. The Callback application is used to extract the values of various parameters stored in the receiver/decoder memory and return these values to the commercial operator via modemmed back channel 17, or by other means.

The API layer 252 provides high-level utilities for interactive application development. It includes several packages that make up this high-level API. The packages provide all the functionality necessary to run interactive applications. The packages are accessible by the applications.

In a preferred embodiment the API is adapted to run applications written in the Java programming language. Furthermore, it can interpret HTML and other formats, such as MHEG-5. Besides these interpreters, it also includes other packages and service modules that are detachable and extensible as requirements dictate.

The Virtual Machine layer 254 is composed of language interpreters and various modules and systems. It consists of everything necessary to receive and execute interactive applications in the receiver/decoder.

The Device Interface layer 256 includes a Device Manager and devices. Devices are software modules which consist of the logical resources necessary for management of external events and physical interfaces. The Device Layer manages communication channels between drivers and applications and provides enhanced error exception checking. Some examples of managed devices are: card readers, modems, network, PCMCIA (Personal ComputerMemory Card International Association), LED display and so on. Programmers do not have to deal with this layer directly, since the API layer controls the devices from above.

The System Software/Hardware layer 258 is provided by the manufacturer of the receiver/decoder. Because of the modularity of the system and because services supplied by the OS (such as event scheduling and memory management) are part of the Virtual Machine, the higher layers are not tied to a particular real-time operating system (RTOS) or to a particular processor.

Figure 6:
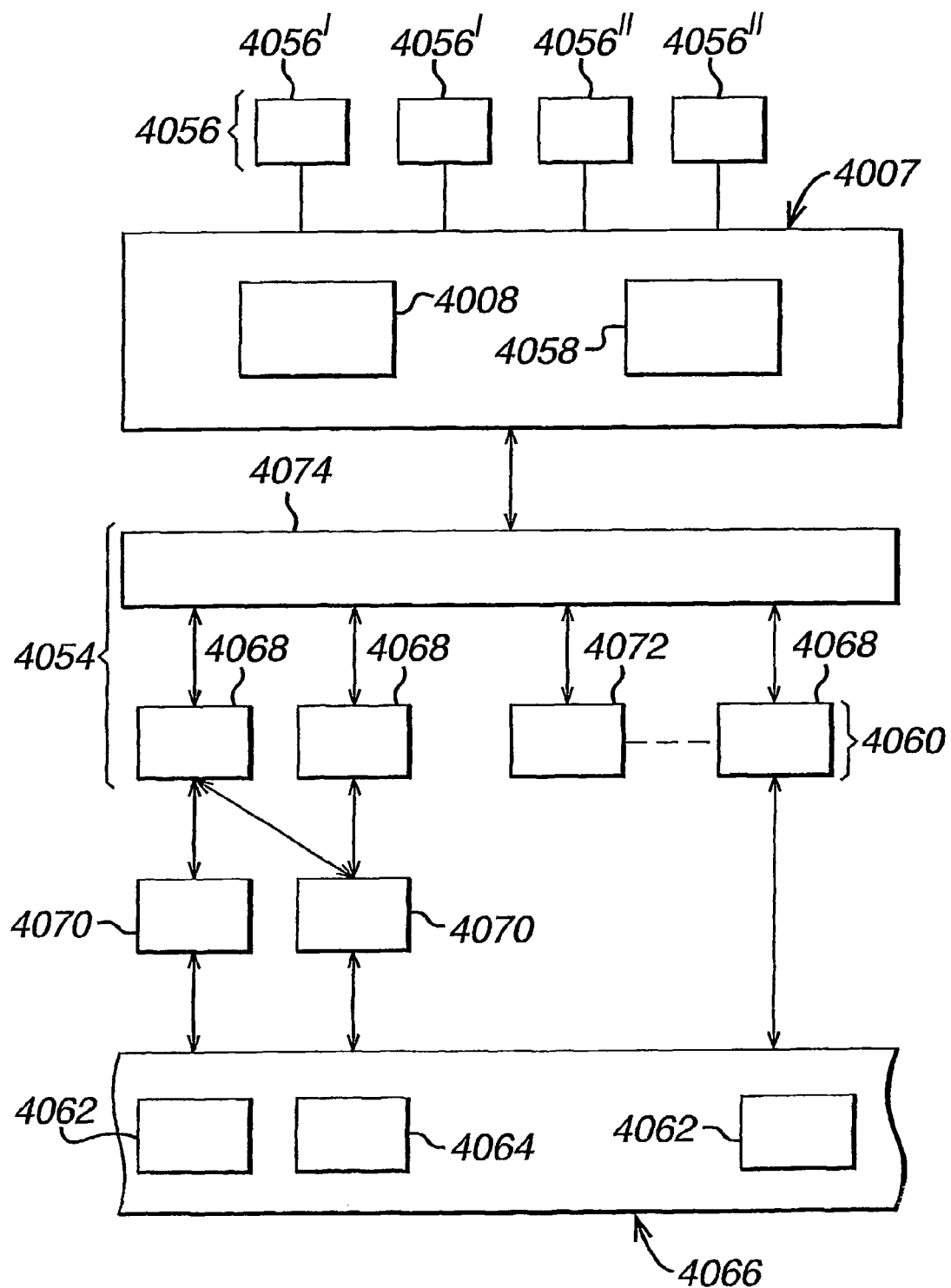
FIG. 6 is an Illustration in more detail of the architecture of a receiver/decoder.

With reference to FIG. 6, The Device Interface layer 256 will now be described in more detail.

A device 4060 may correspond to a component 4062 or physical interface 4064 of the hardware 4066. Such devices are referred to as "low level devices" 4068. The output of such a device 4068 may be connected to at least one device driver 4070 for converting the logical signals output by the device 4068 into signals required to drive, for example, a hardware interface 4064. Alternatively, the device 4068 may itself drive a component or interface of the receiver/decoder 2020, that is, the output of the device may be connected directly to the hardware 4066.

Two examples of low level devices 4068 are an LCARD device, which enables a program to communicate with the smartcard contained in one smartcard reader 4036, and an RCARD device, which enables a program to communicate with the smartcard contained in the other smartcard reader 4036. For example, these devices enable a program to read the state of the card, read the card history and send an input message to the card. The devices also inform a program of the insertion of a card in to the reader, removal of a card from a reader and card reset if not requested by the program. The LCARD and RCARD devices are specific to the protocol used for running the card. Typically an ISO7816 protocol is used.

In addition to "low level devices" the receiver/decoder 13 may also include "high level devices" 4072 which control operation of the receiver/decoder 13. An example of a high level device is an MLOAD device, which allows an application to load an MPEG section, a complete MPEG table or a group of MPEG sections from an MPEG bitstream corresponding to hardware and software filtering criteria. For example, the device enables a program to download only those sections of a group that are required at any one time by an application.

Content Management and Protection System (CMPS)

Figure 7:
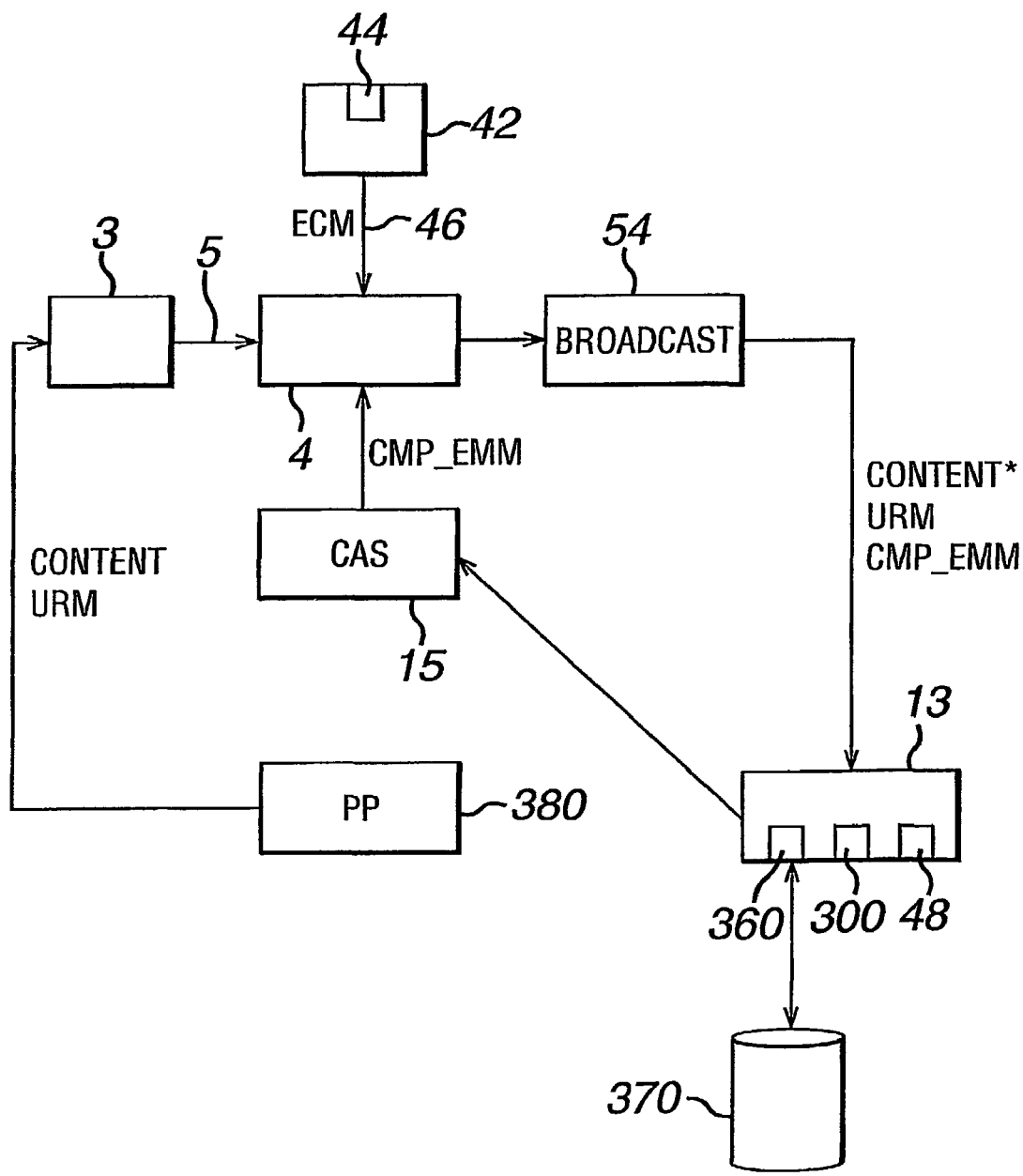
FIG. 7 is an overview of a first preferred embodiment of a content management and protection system (CMPS)

The Content Management and Protection System (CMPS) will now be described with reference to FIG. 7, like parts to those described in other figures being denoted by like numerals.

A programme provider 380 is connected to a broadcast centre, and in particular to an MPEG compressor 3, via some form of connection, such as a high speed internet connection, for example. As noted above, the compressor is connected to a multiplexer/scrambler 4, as are ciphering units 42 (incorporating a "mother" smartcard 44), and a conditional access system 15. In turn, the multiplexer/scrambler 4 feeds into a broadcast system 54, which delivers the output of the broadcast centre to a receiver/decoder 13. The receiver/decoder itself comprises a daughter conditional access smartcard 48, the receiver/decoder portion of the CMPS 300, and an interface 360 to a mass storage device 370 which is attached to the receiver/decoder.

The receiver/decoder portion of the CMPS 300 comprises a security module (in the form of a removable smartcard) 320 (not shown) and an associated software middleware layer 310 (not shown). In a variant of the preferred embodiment, the CMPS and the CAS share a single smartcard, and in another variant, the receiver/decoder portion of the CMPS is implemented entirely in the software middleware in the receiver/decoder. The receiver/decoder portion of the CMPS 300 will be described in more detail below.

The head-end portion of the CMPS 300 similarly comprises a security module (in the form of a removable "mother" smartcard, not shown). In a variant of the preferred embodiment, the CMPS and the CAS share a single "mother" smartcard (not shown), and in another variant, the head-end portion of the CMPS is implemented entirely in software running on one or more head-end servers.

In practice, the programme provider 380 sends programme content ("CONTENT") to the MPEG compressor 3 for transmission to the receiver/decoder 13. As described above, the multiplexer/scrambler 4 scrambles the content with the scrambling key generated by the cipher units 42, and also multiplexes into the transport stream 7 the ECMs ("ECM") also generated by the cipher unit, and data from the conditional access system.

The content produced by the programme provider may be subdivided into different sections, or 'chapters', as will be described in the next section. As is described elsewhere, the content may take many different forms, such as audiovisual data, music files, computer files, and other data files.

In addition, the programme provider 380 is able to specify, in relation to a particular content, usage rules which must be observed when, and if, such a content is recorded by the receiver/decoder 13 and mass storage device 370 and subsequently played back. The usage rules may alternatively specify that no such recording or playback is authorised. These usage rules are encapsulated in Usage Rules Messages ("URM") and sent to the compressor 3. In a variant of the preferred embodiment, the URMs are sent to the broadcast centre and transmitted via alternative means, for example by sending them directly to the multiplexer 4 for inclusion in the transport stream 7.

The URMs typically contain legal or commercial access criteria to content, such as, for example, limits on the number or type of copies of a recording which can be made, "trick mode" restrictions on fast-forwarding, time-shifting restrictions, moral ratings, and data relating to distribution modes, such as super-distribution flags. The rules may also specify the price of content associated with different consumption modes (such as pay-per-play, rentals, and so on) by specifying a currency and an amount, or a required number of tokens, in an electronic wallet; the rules may be complex, for example stating that one free preview is offered upon subscription to a particular service, or that discounts may be offered on a programme according to the end-user's consumption history. Content management information may further include information concerning micropayment schemes associated with transactions, such as pay-per-view, for example. Such micropayment schemes may result from a contract between content providers and technology providers.

URMs may be obtained prior to the broadcasting or recording of programmes, for example by means of an Electronic Programme Guide (EPG). It is possible for many EPGs to be made available from different sources (for example, by broadcast, from a television magazine web site, through a content owner/distributor 'walled garden', and so on). Multiple URMs associated with a given piece of content may therefore be acquired from various sources, providing the end-user with a greater choice and flexibility in ways of consuming content.

The URMs are encrypted with a URM exploitation key, which in a variant of the preferred embodiment is the same as the ECM exploitation key. An equivalent of the URM exploitation key is maintained in the receiver/decoder CMPS smartcard 320 (not shown) to allow the URMs to be decrypted.

It is important to note that the URMs may be sent independently of the content, providing that certain basic provisions are met (namely, that the URM relating to a particular content or chapter within a content is received by a receiver/decoder before the content or chapter of the content). In general URMs are synchronised to particular times or events within programmes (such as the beginning and end of advertisements) or to the start and end of the programmes themselves, although URMs can also, in fact, be synchronized to particular cryptoperiods corresponding to particular ECMs; synchronization and cross-referencing between the URM and corresponding portion of content or ECM is accomplished by use of use of special identifier fields ("session number" fields) in the URMs (and optionally ECMs). Alternatively, URMs without such cross-referencing have effect as of the time at which they are received.

To allow the programme provider, or any other party, to produce URMs, a URM generator and a URM transmitter are required (both not shown). Typically URM generators consist of dedicated servers connected to an internal broadcast centre network For URMs to be targeted to individuals or groups of subscribers, certain subscription information, generally available from the subscriber management system (not shown), may be required. Additionally, a bidirectional link to the broadcast centre is provided to facilitate the exchange of information necessary to synchronise URMs to cryptoperiods, if necessary. In a variant of the preferred embodiment, this link is not provided, the synchronization being performed by the broadcast centre itself.

It is noted that although the URMs may be 'targeted', they are nevertheless usually delivered to the whole audience, the 'target' conditions being encoded in the message itself (for example, recording and subsequent viewing of a particular weather programme is free provided that the end-user has subscribed to another service, such as the CNN Channel, for instance).

Apart from the URMs, content and ECMs, access rights are generally required to allow a user to record and/or playback using the receiver/decoder and mass storage device. These access rights are provided in the form of CMPS Entitlement Management Messages ("CMP_EMM"); CMP_EMMs can have the same structure as conventional EMMs, but are generally more key-oriented—a CMP_EMM typically embeds a key associated with a content or service. Rights to playback recorded content are granted in return for one-off payments (impulse purchases) or subscriptions. Various levels of access rights can also be granted in relation to any content, whereby a user could, for example, pay a first fee in exchange for the rights to replay content once, or pay a second, higher, fee in return for unlimited replays. CMP_EMMs are typically stored in the receiver/decoder CMPS smartcard, but maybe stored elsewhere, such as in a conditional access smartcard, for example.

In the preferred embodiment, rights to replay a recording can either be obtained after the recording is made (the 'pay-per-view' model), or prior to the recording (the 'subscription' model). In the former case, after recording the content, the user instructs the conditional access system 15 (via the bidirectional link between the receiver/decoder 13 and the conditional access system 15) that he wishes to obtain the rights to playback the content. If the instruction is authorised by the subscription management system, the appropriate CMPS Entitlement Management Message ("CMP_EMM") is then transmitted to the receiver/decoder via the bidirectional link.

One of the many advantages provided by the CMPS system is that the access rights for recording and playing back programmes are entirely independent of the access rights for simply viewing the programmes, as in conventional systems. Thus, one could have the situation where one could view a programme but not record it and play it back, and conversely one could be unable to view a programme, but one could record it, obtain the necessary rights and then play it back.

The latter scenario is possible in the preferred embodiment because the usage rules and access conditions are only enforced at the playback stage, not the recording stage. In a variant of the preferred embodiment, the rights are enforced at the recording stage as well, providing a different balance between security and ease of use.

Taking advantage of the independence of the CMI from the access rights, the CMI may vary from time to time for a given content stored in the end-user home network. For example, in the case of a stored pay-per-view programme whose usage rights have expired, it is very likely that several months after the actual recording, commercial rules for the programme will change (such that the content is now available on a subscription basis) and will be broadcast again to the CMPS.

Figure 8:
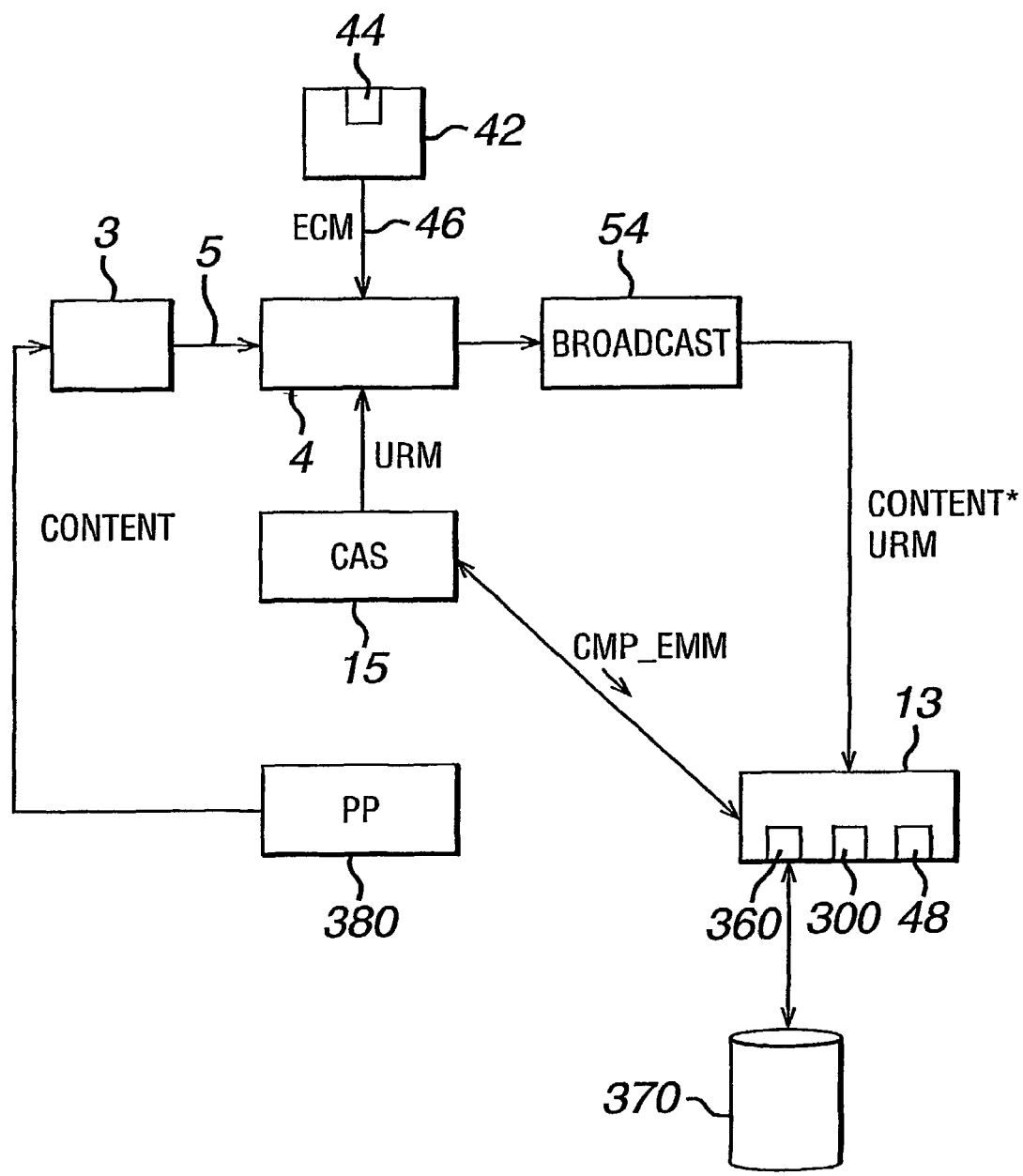
FIG. 8 is an overview of a second preferred embodiment of a content management and protection system.

With reference to FIG. 8, a second preferred embodiment will be described. In this embodiment like parts are denoted by like numerals.

A compressor 3, multiplexer/scrambler 4, cipher units 42, a conditional access system 15, broadcast system 54, programme provider 380 and receiver/decoder 13 are provided as before.

In contrast to the previous embodiment, however, the conditional access system 15 not only provides the CMPS EMMs ("CMP_EMM") to the receiver/decoder 13 on request, but is also responsible for the generation of the Usage Rules Messages ("URM") and the forwarding of the same to the multiplexer/scrambler 4.

The URMs ("URM") are less closely integrated with the generation and transmission of the content ("CONTENT") by the programme provider, but at the same time the ECMs ("ECM") become more closely integrated with the URMs ("URM"). In the present system, the independence of the content, URMs and CMPS EMMs, and the resulting flexibility, is yet again noted.

In variants of the second embodiment, the URMs are transmitted by third parties (not shown) having no physical and/or other association with the broadcast centre and/or programme provider. In such variants, even more flexibility is provided regarding the distribution of the usage rules.

Figure 9:
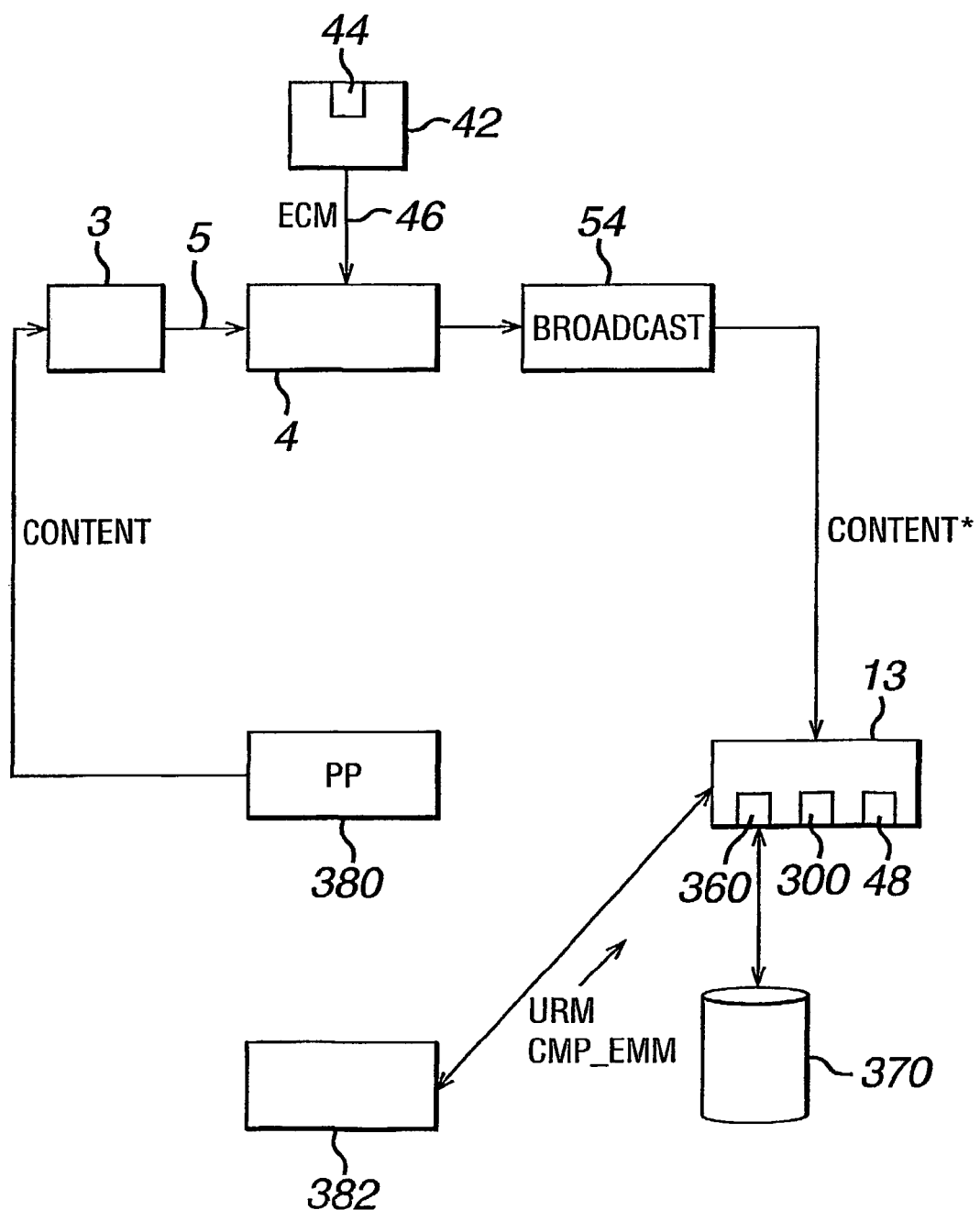
FIG. 9 is an overview of a third preferred embodiment of a content management and protection system.

With reference to FIG. 9, a third preferred embodiment will be described. In this embodiment like parts are denoted by like numerals.

A compressor 3, multiplexer/scrambler 4, cipher units 42, broadcast system 54, programme provider 380 and receiver/decoder 13 are provided as before. An independent party 382 is also provided, with a connection to the receiver/decoder 13. The connection takes the form of an internet connection, but in variants of the preferred embodiment may take many other forms, such as a telephone connection, ADSL connection, radio link, satellite channel or a network of any sort.

In this embodiment, the third party 382 is responsible for distributing the usage rules and CMPS access rights to the receiver/decoder. The third party is typically one of many sites on the internet selling rights to recordings of interest. In variants of the third embodiment, the third party may instead be a service supplier, programme supplier, or other interested party.

As before, on receipt of an instruction from the user, typically involving a payment of some kind, the third party 382 sends the access rights and usage rules to the receiver/decoder. In this case, the user must record the content after completing this transaction, because the usage rules are required before the recording stage.

Figure 10:
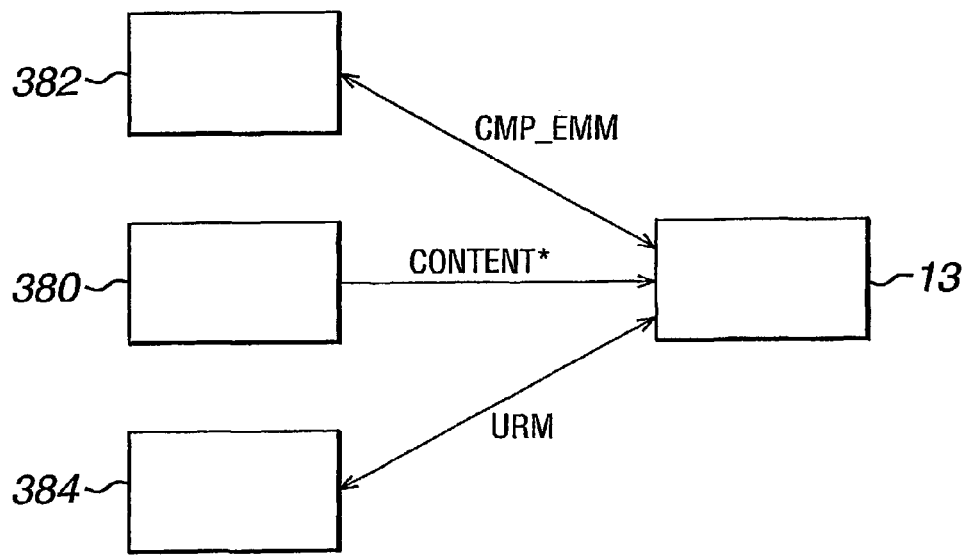
FIG. 10 is an overview of a fourth preferred embodiment of a content management and protection system.

With reference to FIG. 10, a fourth preferred embodiment will be described. As is the case previously, like parts are denoted by like numerals.

In this embodiment, particularly typical of an internet distribution model the scrambled content ("CONTENT*"), CMPS EMM ("CMP_EMM") and URMs ("URM") are all delivered independently to a receiver/decoder 13, from a first party 382, second party 384 and third party 380. The first, second or third party may be, for example, a multi access portal (MAP).

Structure of a Transmission

Figure 11:
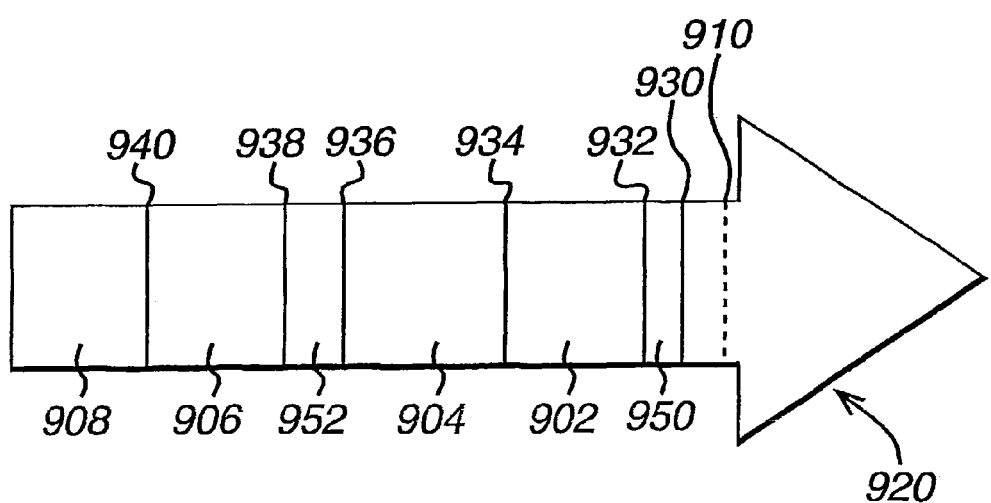
FIG. 11 is a schematic illustration of the structure of a typical transmission.

With reference to FIG. 11, which illustrates the structure of a typical transmission, a specific example will now be described.

A transmission 920, in this case a received transport stream from a satellite transmission, corresponds to a film, divided into different sections including four chapters (each chapter comprising a number of whole scenes) 902, 904, 906, 908, a trailer 950 and an advertisement break 952.

In this example, each of the six sections of the transmission requires a different set of usage rules, so correspondingly six URMs are generated. In the mode where URMs are associated with particular transmission times or ECMs by assigning the URMs specific session numbers, all of the URMs can be transmitted at the beginning of the transmission In the other mode in which the URMs are transmitted at the instant from which they are required to take effect, the six URMs are transmitted at times 930, 932, 934, 936, 938, 940 corresponding to the start of each of the corresponding sections.

In this example a CMPS Entitlement Management Message (CMP_EMM) 910 is transmitted before the content begins, enabling the recording and playback of the content at a later date. As described above, the CMP_EMM may in other cases be transmitted after the content is recorded.

The URM corresponding to the section 950 (a trailer) imposes no restrictions on the number of times the section can be viewed, and specifies that "trick" modes are forbidden (in other words, so the user cannot fast-forward through the trailer).

By contrast, the URM corresponding to the section 904 specifies a 15 rating for the chapter, allows all "trick" modes, but specifies that the chapter may only be viewed up to three times before the rights expire.

Storing and Retrieving Content at a Receiver/Decoder

Before turning to the system of the preferred embodiment, an example of a prior art system will be briefly revisited.

Figure 12:
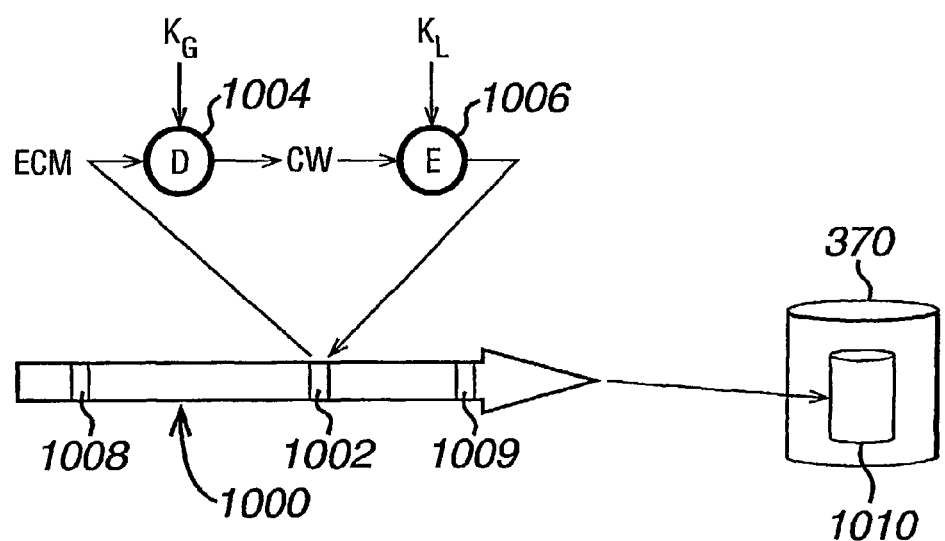
FIG. 12 is a schematic illustration of the prior art processing of a received transmission before recording.

FIG. 12 schematically illustrates part of the method disclosed by French Patent Application No. 95 03859 (as referenced above) of processing and recording a transmission.

A portion of a transmission 1000 in the form of a data stream includes an ECM 1002. The ECM is extracted from the signal and passed to a decryption stage 1004, where the ECM is decrypted using an equivalent of a (global) exploitation key $K_G$ and the resulting control word (CW) is then passed to an encryption stage 1006, where it is encrypted with a local exploitation key $K_L$. The resulting ECM 1012 is then reinserted back into the data stream 1000, and a similar process is conducted with the remaining ECMs 1008, 1009 and so on. The modified data stream is subsequently stored in one file 1010 in the mass storage device 370.

Figure 13:
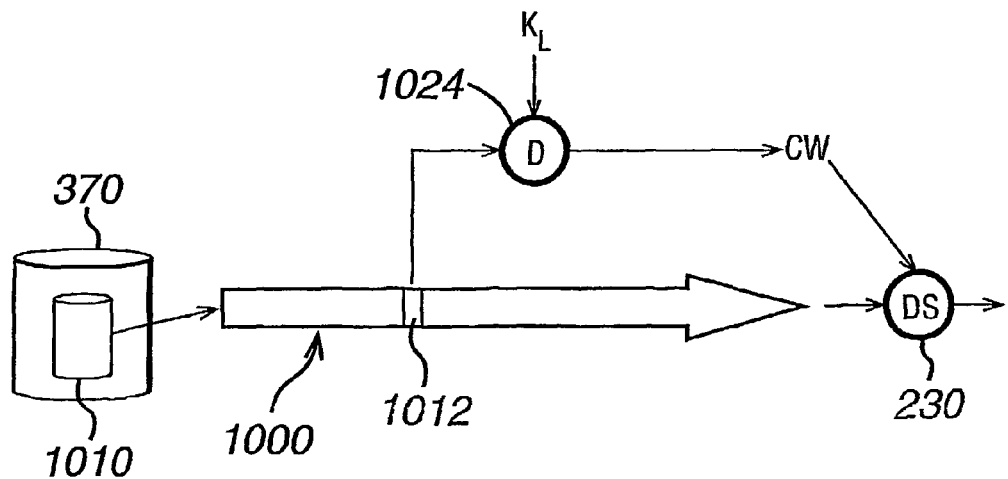
FIG. 13 is a schematic illustration of the prior art processing of a received transmission before playback.

FIG. 13 schematically illustrates part of the corresponding method disclosed by French Patent Application No. 95 03859 (as referenced above) of processing and playing back a transmission.

When playback is initiated, a data stream (representing a portion of a transmission) 1000 is extracted from a file 1010 stored in the mass storage device 370. An ECM 1012 is extracted from the data stream and passed through a decryption stage 1024, which decrypts the ECM using an equivalent of the local exploitation key $K_L$ to produce the control word (CW). The control word is then passed to a descrambler (DS) 230 to allow the corresponding portion of the data stream to be descrambled, and the process is then repeated with the remaining ECMs.

In contrast to the prior art system described above, the processing and recording of a scrambled transmission according to the preferred embodiment will now be described.

Figure 14:
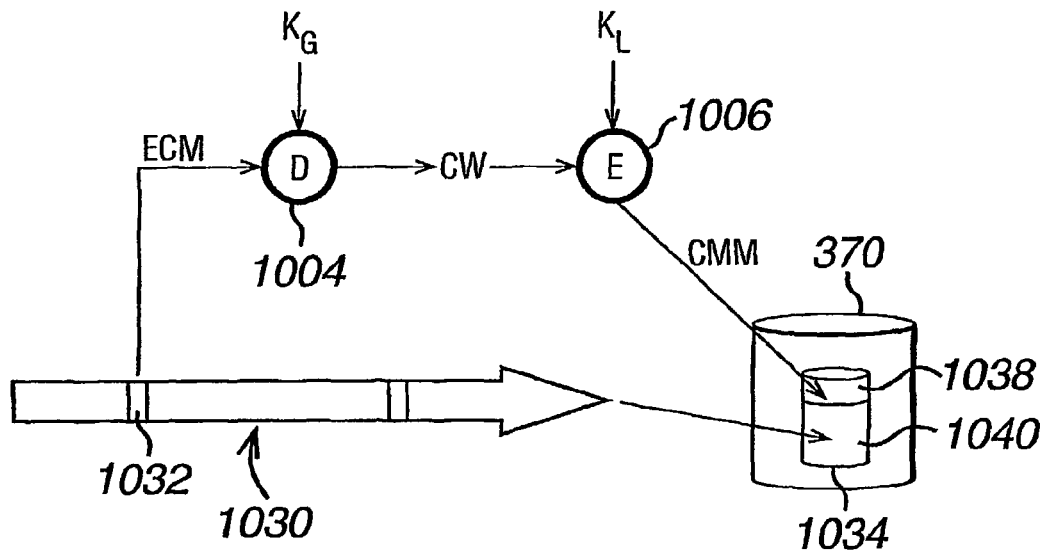
FIG. 14 is a schematic illustration of the processing of a received transmission before recording.

FIG. 14 illustrates the method of processing of a datastream or bitstream 1030 according to the preferred embodiment herein, the datastream or bitstream representing a portion of a transmission which is to be recorded. The datastream or bitstream includes a plurality of ECMs, including ECM 1032. The ECM is passed to the decryption stage 1004 (D), where it is decrypted using an equivalent to a general exploitation key $K_G$, and the control word (CW) is extracted. The control word is passed to the encryption stage 1006 (E) where the control word is encrypted using a local exploitation key ($K_L$), as before. The resulting Control Management Message (CMM) is then passed to the mass storage device 370 for storage in a header, or management data portion, 1038 of a file 1034. The bitstream 1030 is also passed to the mass storage device, and is stored in a content portion 1040 of file 1034. The header 1038 also includes an index table comprising indices mapping time offsets in the datastream or bitstream to data offsets in the file. In further variants of the preferred embodiment, the datastream or bitstream 1030 and the plurality of generated CMMs are stored in separate files.

Furthermore, pre-recorded mass storage data formats are envisaged whereby the content is stored in a relatively cheap read-only portion of the device, and the control information is stored in a relatively expensive read/write portion—the updateability of the control information being required for variants of the preferred embodiment described elsewhere which use dynamic CMMs.

Figure 15:
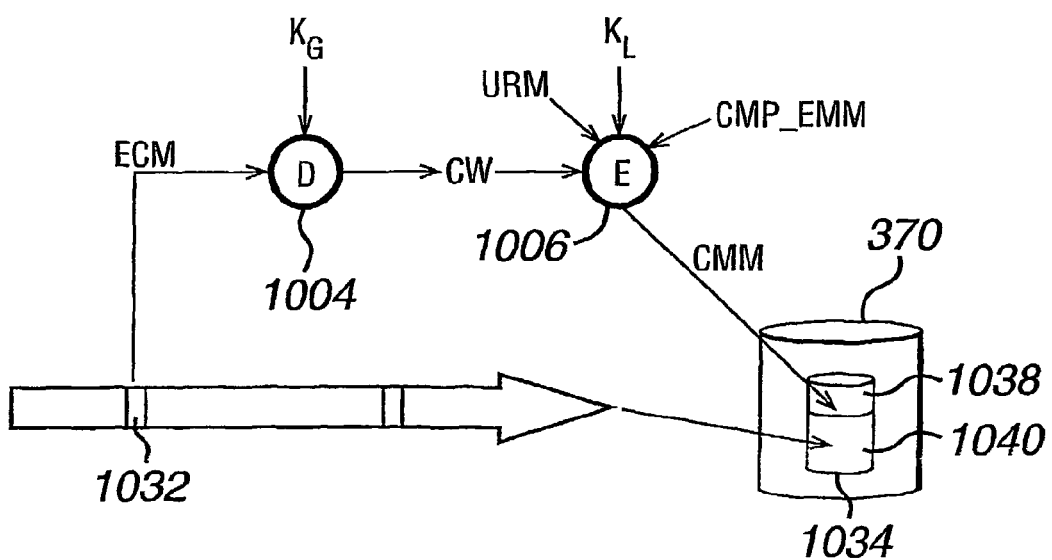
FIG. 15 is a schematic illustration of an alternative processing of a received transmission before recording.

FIG. 15 illustrates the method of processing of a datastream or bitstream 1030 according to an alternative of the preferred embodiment, the datastream or bitstream representing a portion of a transmission which is to be recorded. The datastream or bitstream includes a plurality of ECMs, including ECM 1032. The ECM is passed to the decryption stage 1004 (D), where it is decrypted using an equivalent to a general exploitation key $K_G$, and the control word (CW) is extracted. The control word is passed to the encryption stage 1006 (E) where the control word, usage rules data (URM) and access rights (CMP_EMM)—the latter being optional—are encrypted using a local exploitation key ($K_L$). The resulting Control Management Message (CMM) is then passed to the mass storage device 370 for storage in the header, or management data portion, 1038 of the file 1034. The datastream or bitstream 1030 is also passed to the mass storage device, and is stored in the content portion 1040 of the file 1034. The header 1038 also includes an index table comprising indices mapping time offsets in the datastream or bitstream to data offsets in the file. In further variants of the preferred embodiment, the CMM and the datastream or bitstream 1030 are stored in separate files.

Several advantages can be realised by storing the conditional access information required to descramble the content in a separate file to the content itself. First of all, because the content is not modified in any way during the recording process, its storage is simplified, and can be automated to a greater extent. Secondly, the division of the content and CMM recognises the fact that the latency, bandwidth and capacity requirements of each type of data are very different during recording and playback, and correspondingly, separating the two into two different files allows the mass storage device and associated controller to operate more efficiently.

By wrapping up the conditional access and content management components (control word, usage rules and CMP_EMM) into one encrypted packet and storing it independently of the content, the security, flexibility and efficiency of the system are increased.

Figure 16:
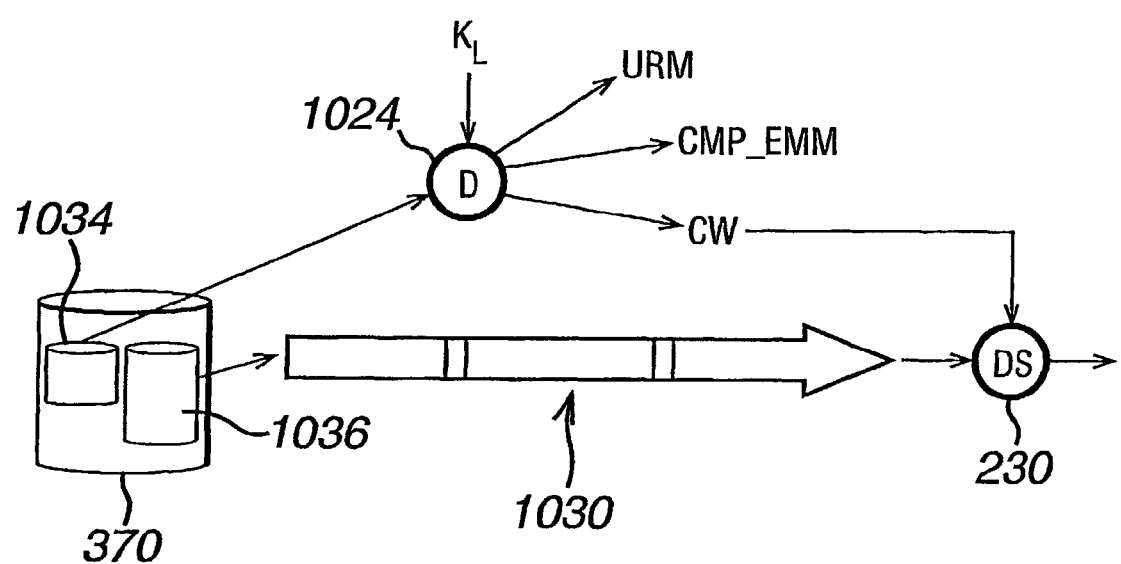
FIG. 16 is a schematic illustration of the processing of a received transmission before playback.

Finally, FIG. 16 illustrates the converse process of processing and playing back data stored in the mass storage device in the preferred embodiment. A data stream 1030 is passed from a file 1034 within a mass storage device 370 to a descrambler 230. The Control Management Message (CMM) from a separate control information file 1034 is passed to a decryption stage 1024, where it is decrypted using an equivalent of a local key $K_L$. The control word (CW) thus extracted from the CMM is passed to the descrambler 230 to enable the corresponding portion of the data stream to be descrambled.

Further Detail Regarding the CMPS

The Content Management and Protection System is now described in more detail.

Firstly, different functions associated with a CMPS system are described. The interface of the CMPS with a hard disk video recorder (HDVR) is then discussed, followed by a description of the protocols and actions associated with the playback of a programme. The interface between the CMPS and the Conditional Access System is then described in more detail, including discussion of the data passed between the conditional access system and the content management and protection system, and encryption software. Modes of operation of preferred embodiments are discussed in detail; including personalisation mode, super-distribution in subscription mode, post-purchase super-distribution, and pre-purchase super-distribution. The security library (API) is described in detail, and a list of functions is presented.

Interface with HDVR

The interface between the CMPS and the Hard Disk Video Recorder (HDVR), the mass storage medium in use in the preferred embodiment, will now be described in more detail.

This section describes the interface between the receiver/decoder portion of the CMPS system and the hard disk video recorder (HDVR) which allows the classic Video Recorder functions to be put in place from recorded content. The definition of such an interface arises from the need to record encrypted content on hard disk so as to guarantee at the same time the establishment and longevity of new methods of distributing A/V content as well as respecting legislation (notably copyright). It therefore concerns specifying the relationship between the client (HDVR) and the service provider (CMPS) across the two sub-systems while identifying the requirements of the HDVR to establish the video recorder functionalities and to render the secure management of the hard disk transparent for the user.

After a general description of the linked principles of recording and playback, protocols, and details of the exchange of messages between the CMPS and the HDVR are presented.

Recording Using the HDVR

The procedure followed and issues arising in relation to the CMPS/HDVR interface when recording a programme will now be described.

At the time of recording a programme, HDVR generates a file whose structure is mainly in two parts: management data (for example, hdvr_file.management_data) and content itself (for example, hdvr_file.content_data).

The first part of the file corresponds (among other things) to local messages (Content Management Messages—CMMs) generated and handled by the CMPS, which contain the usage rules of the content as well as the associated unscrambling keys (the control words in other words). The first part also comprises an index table comprising indices mapping time offsets in the bitstream to data offsets in the file.

The second part is made up of a partial transport stream (pTS) corresponding to the various components of a given programme (video, audio, subtitles, and so on) and remains scrambled, as broadcast, in the common scrambling format DVB_CS. In variants of the preferred embodiments, the management data and content are stored in at least two separate files.

Taking into account the broadcasting architecture reserved for the CMMS, in which the transmission of the CWs (control words) remains exclusively within the competence of the conditional access system (CAS), the CMPS takes charge of synchronisationwith its own management and control messages to create the CMM in each encryption period. This CMM is then sent to the HDVR for insertion into the hdvr_file.management_data part. The CMPS also communicates a certain amount of information regarding the management of the content (hdvr_data), such as the start points of chapters or the authorised maximum extent of recording in time-shift mode.

Figure 17:
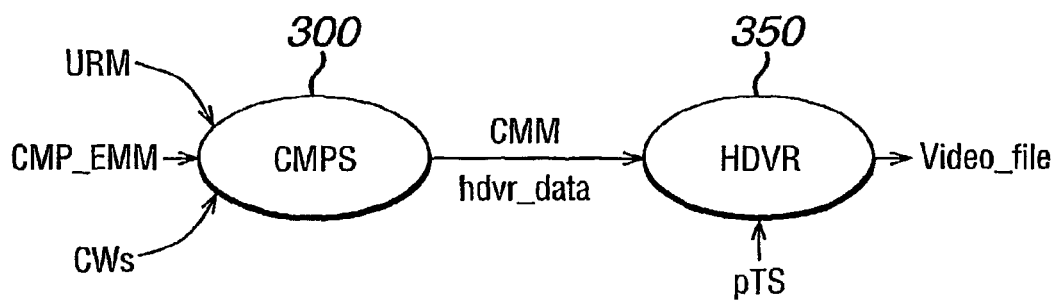
FIG. 17 is an illustration of the flow of data between the CMPS and the HDVR.

This is illustrated schematically in FIG. 17. The URM, the CMP_EMM and the CWs are input to the CMPS. hdvr_data is passed from the CMPS 300 to the HDVR 350.

As mentioned above, the hdvr_file.management_data part of the file also comprises an index table comprising indices mapping time offsets in the bitstream to data offsets in the file. Two types of indices are included in the index table, HDVR indices, which are inserted automatically by the HDVR, and User indices, which are inserted upon command of a user.

The HDVR indices are positioned by the HDVR at intervals corresponding to periodic time offsets in the bitstream and are used as play entry points in the recorded file. In preferred embodiments, HDVR indices are generated by an HDVR automatically during the recording of a programme.

The User indices are also play entry points, and are set by a user at the time of recording of a programme or during playback of a recorded programme The Index table also comprises pointers mapping each HDVR and User index to an appropriate CMM, enabling decryption of the stored bitstream at the points indexed by then HDVR and User indices.

Processing recorded content, for instance searching for points in a file, or a corresponding bitstream, and "trick mode" operations such as fast forwarding, rewinding, and skipping make use of HDVR and User indices stored in the index table.

Figure 18:
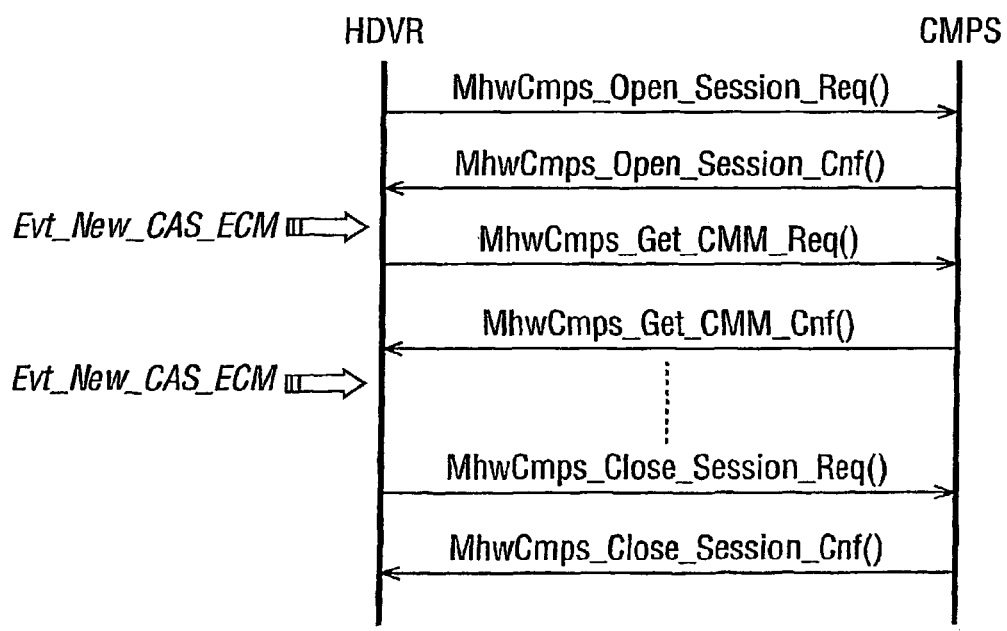
FIG. 18 is an illustration of the protocol put into play during the content recording phase.

The protocol put into play during the content recording phase is shown in FIG. 18. At the instigation of the HDVR sub-system, a session is opened with CMPS allowing the recovery of the CMM data at the time of each event Evt_New_CAS_ECM associated with a new cryptoperiod. As a result, it is up to the CMPS to subscribe equally to this event in order to treat the synchronisation constraints between the recorded pTS and the CMM returned by the URM, the CMP_EMM, and the CWs contained in the ECMs. The syntax of these different exchanged messages is detailed below.

The data required by the HDVR during the recording phase will now be described.

Given that the HDVR sub-system is responsible for synchronising the CWs with the pTS at the time of playing back of content, it is its responsibility, during the recording phase, to associate the arrival of a ECM to the corresponding CMM sent by the CMPS. The CMPS control and management data (URM—Usage Rules Message—and CMP_EMM) as well as the ECM being returned via the MLOAD_device, the HDVR module consequently subscribes to an event associated with loading the CA_message_section sections carrying the ECM (Evt_New_CAS_ECM). At the time of arrival of this event, HDVR requests the CMM to obtain navigation and usage constraint information associated with the CMPS server. This information is respectively called CMM.navigation and CMM.hdvr_rules.

Figure 19:
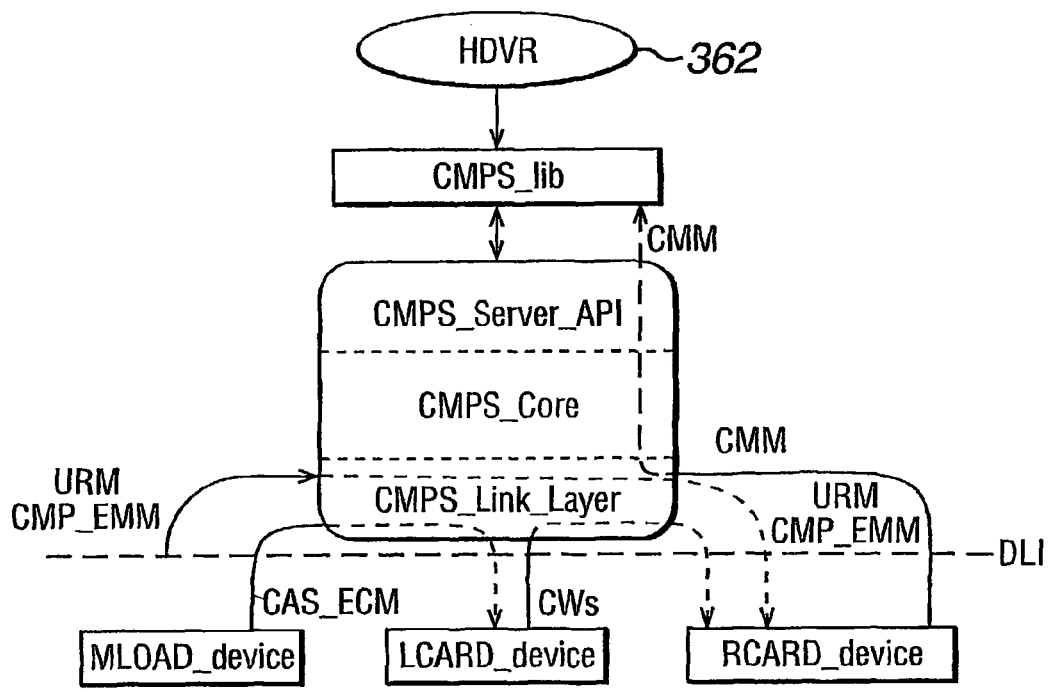
FIG. 19 is a schematic illustration of the flow of data between the CMPS and associated devices.

The creation of the CMM as regards the different broadcast information is shown schematically in FIG. 19. In this embodiment, the CAS and CMPS are present on physically different supports.

The CMP_EMM and the URM are passed from the MLOAD_DEVICE 392 to the RCARD device 396. The ECM is passed from the MLOAD_DEVICE 392 to the LCARD device 394. The ECM is decrypted at the LCARD device 394 and the control word (CW) is extracted. The CW is passed to the RCARD device. The CW, the URM, and the CMP_EMM are combined and encrypted at the RCARD device, and the resulting control management message (CMM is passed to the CMPS_lib.

This embodiment is particularly useful in situations with large memory requirements, as the CMPS security module has access to the entire memory on the smartcard (as opposed to the embodiment described below, where the memory on the smartcard is shared with another component). Furthermore, the CMPS smartcard can be removed or upgraded without adversely affecting other systems, such as the conditional access system.

Figure 20:
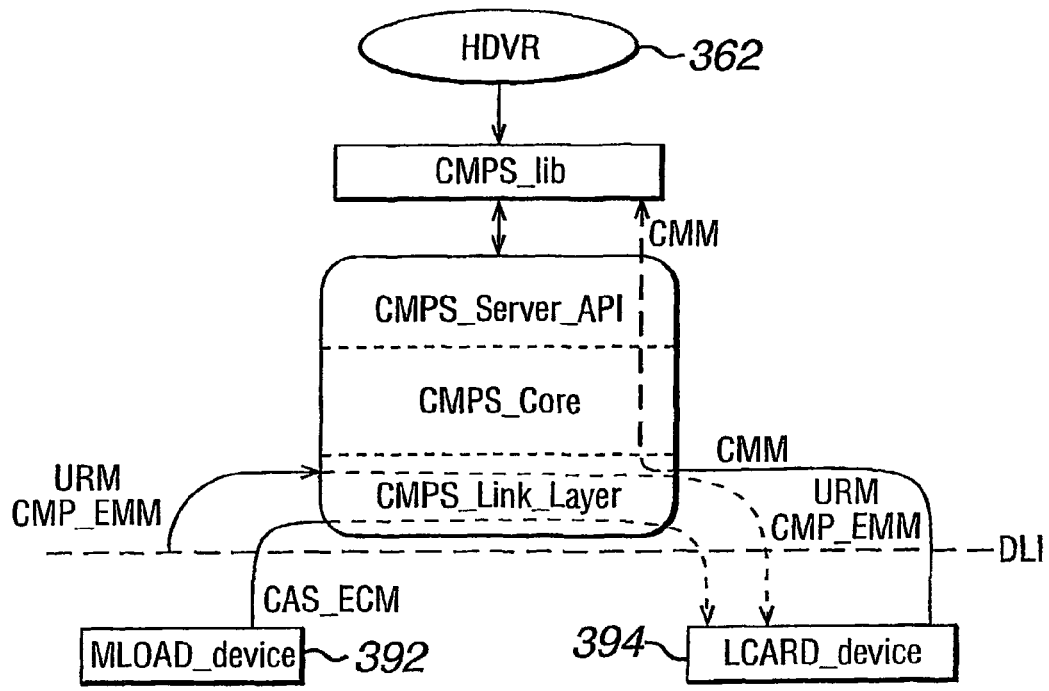
FIG. 20 is a schematic illustration of the flow of data between the CMPS and associated devices in another embodiment.

FIG. 20 shows an alternative embodiment in which the CAS and CMPS are present on the same physical support.

The ECM is passed directly to the conditional access/CMPS smartcard, via the LCARD device, where the control words (CW) are extracted. The URMs and the CMP_EMMs are also sent directly to the conditional access/CMPS smartcard, via the LCARD device. The URMs, CMP_EMMs and the CWs are combined and encrypted in the smartcard, and the resulting CMMs are passed to the CMPS_lib.

Smartcard technology (ROM, EEPROM and Flash devices) is used to implement this embodiment and the previous embodiment. In this framework, common software resources form the object of a common security API (toolbox).

In a variant of this embodiment (not shown), the ECMs are sent directly to the LCARD device by the equivalent of the CAS_Link_Layer, and the information exchanges (such as requesting control words and so on) are negotiated within the smartcard by the two applications.

Figure 21:
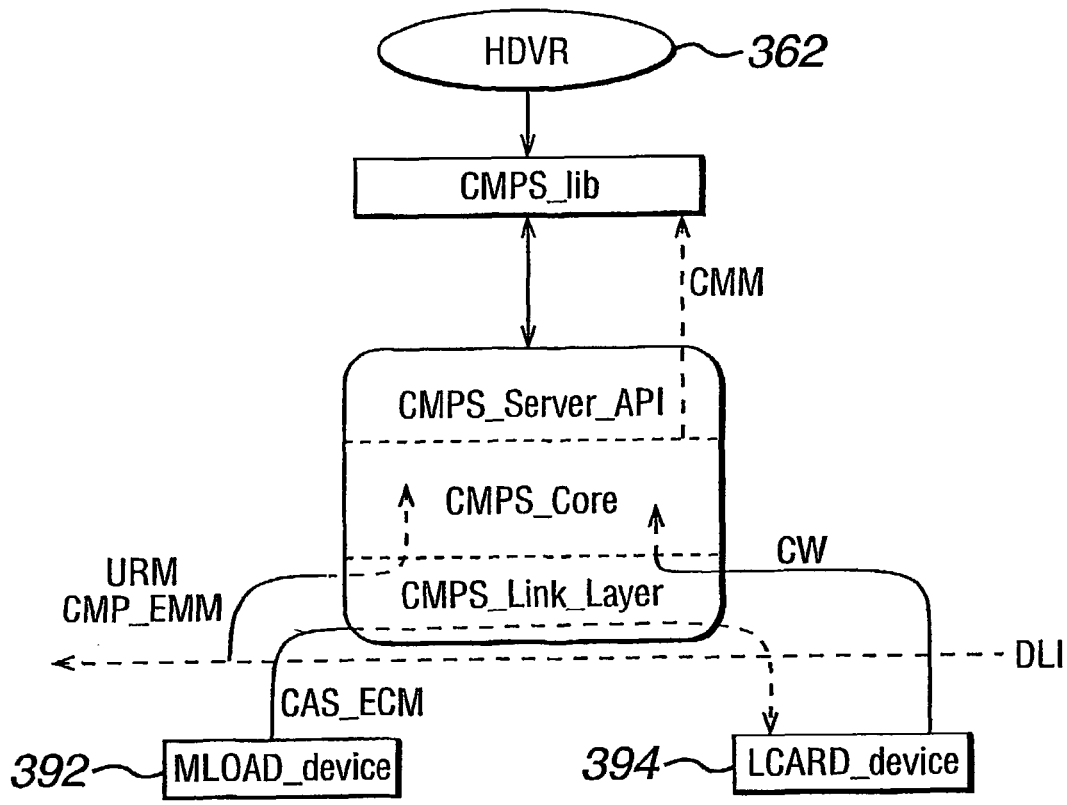
FIG. 21 is a schematic illustration of the flow of data between the CMPS and associated devices in a further embodiment.

With reference to FIG. 21, in a further alternative embodiment, the system may be present in middleware.

The URM and the CMP_EMM are passed from the MLOAD_device to the CMPS_core. The ECM is passed to the conditional access smartcard, via the LCARD device, where it is decrypted and the control word is extracted. The control word is sent to the CMPS_core where it is combined with the URM and optionally CMP_EMM and then encrypted. The resulting CMM is passed from the CMPS_core to the CMPS_lib.

Playback Using the HDVR

The procedure followed and issues arising when playing back a programme will now be described.

At the time of using a recorded content, the CMPS ensures the validity of the associated rights by comparing the usage rules presented in the recorded CMM with the rights acquired by the subscriber and included in the security module (SM). This mechanism preferably remains clear for the HDVR application, apart from possible error messages (status) describing an invalid action in response to a request. Certain of the messages are preferably in addition relayed to the user using a man-machine-interface application, notably invalid actions on a remote control (for example, when the "trick" mode fast_forward is not authorised in a sequence, a warning is displayed on the screen).

To facilitate navigation within the content, it is possible to reload the descrambler with new CWs without being limited by the handling time inherent in the CMPS SM (Content Management and Protection System Security Module). With this aim the HDVR application is able to ask the server to pre-process a certain number of CMMs before the effective use of the CWs which they contain. To do this, HDVR generates different buffers of the CMMs associated with chapters, index, and encrypting periods either side of the current position. At the request of the CMPS, the HDVR in addition retrieves the updated CMM to be reinserted in the hdvr_file.management_data part of the video file.

Finally descrambling the pTS necessitates only one specific function of the type Set_CW(even key, odd_key) allowing the CWs to be placed in the descrambler at the level of the DLI. As mentioned above, the Device Layer Interface (DLI) is an API of the software developed by the manufacturers, underlying the middleware.

Figure 22:
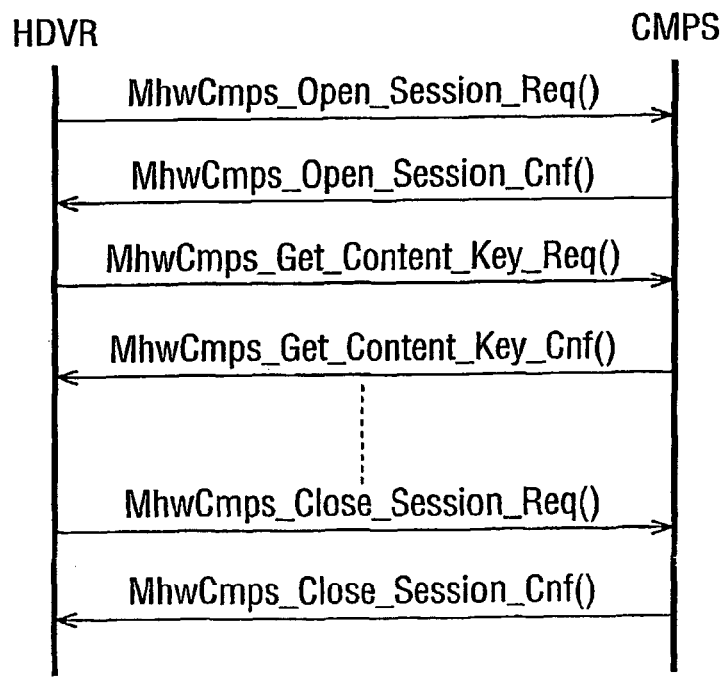
FIG. 22 is an illustration of the protocol put into play during the content reading phase.

The protocol put into play during the content reading phase is shown in FIG. 22. At the instigation of the HDVR sub-system, a session is opened with the CMPS allowing the recovery of the content keys (that is, the CWs) present in the recorded CMMs. To ease navigation and to render secure management transparent to the user, the HDVR sub-system generates several CMM buffers corresponding to the different chapters, user indexes, and cryptoperiods either side of the current position. The content keys returned by the CMPS are encrypted using a session key, and remain so until their effective usage (that is, inputting into the descrambler). The syntax of the different exchange messages is detailed below.

The data required by the HDVR during the playback phase will now be described.

The principal data required by the HDVR is made up of navigation and usage constraint information (CMM.navigation and CMM.hdvr_rules) compared to the content use (labels of the start of chapters, navigation constraints, maximum extent of recording and so on) as well as the state of the CMM buffers submitted for handling at the CMPS server. Certain management information (hdvr_data) may be obtained from the URMs at the time of content recording (typically labels of the start of chapters) in the case where the information is conveyed in clear within the URM. To avoid overloading the hvr_file_management_data part of the video file, other data, such as information about usage constraints (navigation, moral codes of chapters and so on) may be communicated by the CMPS at the time of playback of the content via the CMM.

Descrambling of a series of blocks on the disk corresponding to an encrypting period remains at the instigation of the HDVR which initiates a request to retrieve the associated CWs and load them into the descrambler (for synchronisation). When the contents of the CMM carrying the CWs are dynamic, it is the responsibility of the HDVR to reinsert the updated CMM in the management data file at the request of the CMPS. The structure of levels of Service/Mechanisms/API, describing in outline the needs of the HDVR (for both recording and playback) is shown in FIG. 23. The client library is described in more detail below.

The time-shifting mode, and the various means by which it may be implemented, will now be described in more detail.

Although functionalities associated with "time-shifting" may probably be available to the larger part of the broadcast content, the possibility of prohibiting this mode, and moreover that of putting in place constraints as to the extent of recording time, are part of these CMPS system functionalities in order to respond to the needs of the studios. In addition, legislation in force in certain countries considers this functionality as an exception to the law on copyright. In this case, it is relatively important to ensure that the constraints associated with the mode are respected.

The extent of recording is controlled by the security module, and, as mentioned above, the content is recorded in scrambled form. This helps to enforce the constraints associated with time-shifting.

The different stages involved in playing back a recording are described below, with reference to FIG. 24.

In stage 401, the MLOAD device extracts the URM data and sends it to the CMPS module.

In stage 402, the CMPS module 310 submits the URM to the CMPS SM (Content Management and Protection System Security Module) via the RCARD_device.

In stage 403, the CMPS SM decrypts the URM, verifies that the time-shifting mode is authorised (Info_Data) then generates the CMM which are sent as well as the extent information to the CMPS module. The field pause_count is updated in the CMM.

In stage 404, the CMPS module sends back the assembled data to the HDVR.

In stage 405, at the time of reading in the recorded time window, the HDVR sends back the CMMS to the CMPS module.

In stage 406, the CMPS module sends the CMMS to the SM for decoding.

In stage 407, the SM decodes the CMMs, verifies that the time-shifting mode is authorised and compares in memory the pause_count fields of the CMM and of the last CMM generated from a URM. If the extent of recording is respected, the SM sends back the control words to the CMPS module via a SAC (secure connection). In the opposite case, a message error is sent back to the HDVR via the CMPS module. It is up to the HDVR, which possesses the extent information, to take account of the recording constraints, and it is up to the SM to ensure that they are treated according to the rules dictated by the content distributor.

In stage 408, the HDVR module decrypts the control words, then sends them to the descrambler.

This solution ensures that the constraints associated with the time-shifting mode (extent of recoding time, viewing of advertisements) are taken into account and managed by the SM.

The purpose of the pause_count field mentioned above is to enforce the rule giving the maximum amount of data (or time) which may be recorded in time-shifting mode. When starting the recording phase (in other words, the end user presses the pause button), the CMPS starts converting ECMs and URMs into CMMS, and begins to increment the pause_count counter within these CMMs. When the end-user wants to stop the pause mode (by pressing the play button, say), the CMPS has to send the first recorded CMM to the HDVR. However, the recording process is still going on since there is a time delay between what the end user is watching and the live programme. In this situation, the CMPS is thus able to compare the difference between the pause_count field present in the CMM requested by the HDVR for viewing and the pause_count field embedded by the CMPS in the CMM requested by the HDVR for recording. This difference multiplied by the length of the cryptoperiod shall not exceed the maximum time-shifting duration.

The complexity of implementation is important, especially at the level of handling which impacts the CMPS SM, as well as the exchanges of possible error messages between the application modules CMPS and HDVR.

In variants of the preferred embodiment, different solutions are implemented, achieving different compromises between security and simplicity. Two such solutions will now be described.

In the first solution, the maximum extent of recording is delegated to the HDVR and the limited content window is recorded in clear. The different stages are detailed below with reference to FIG. 25.

In stage 501, the MLOAD_device extracts the URM and sends them to the CMPS module.

In stage 502, the CMPS module submits the URM to the CMPS SM via the RCARD_device.

In stage 503, the CMPS SM decrypts the URM, verifies that the time-shifting mode is authorised (Info_Data), then sends on the control words as well as the extent information to the CMPS module.

In stage 504, the CMPS module transmits the assembled data to the HDVR.

In stage 505, the HDVR application retrieves the extent information necessary for recording management, and sends the control words directly to the descrambler for recording the content in clear.

This solution is the most simple to implement since the CMPS SM is only required for decrypting the URM. In addition the content being recorded in clear, the navigation functions within the time-shifting window are more easily facilitated.

Although the way in which the information (control words and extent constraints) circulates in clear according to ISO-7816 may lead to the creation of a digital copy in clear of all the content on the hard disk (particularly in the context of multi broadcasting), the problem is reduced or eliminated when an authenticated and secure link is established between the CMPS SM and the terminal, and regard for the extent of recording remains entirely in the hands of the HDVR.

In the second solution, usage control is again delegated to the HDVR but the recording is in scrambled form. The different stages are detailed below with reference to FIG. 26.

In stage 601, the MLOAD device extracts the URM data and sends it to the CMPS module.

In stage 602, the CMPS module submits the URM to the CMPS SM via the RCARD_device.

In stage 603, the CMPS SM decrypts the URM, verifies that the time-shifting mode is authorised (Info_Data) then generates the CMM which are sent as well as the extent information to the CMPS module.

In stage 604, the CMPS module sends back the assembled data to the HDVR.

In stage 605, at the time of reading in the recorded time window, the HDVR sends back the CMM to the CMPS module and initiates a request for the CWs.

In stage 606, the CMPS module sends the CMM to the SM for decrypting.

In stage 607, the SM decrypts the CMM, verifies that the time-shifting mode is authorised, then sends back the control words to the CMPS module via a secure authenticated channel (SAC).

In stage 608, the HDVR module decodes the control words, then sends them back to the descrambler. This is in contrast to the variants illustrated in FIGS. 24 and 26, where the CMPS sends the control words to the descrambler.

Compared to the preceding solution, the risk is limited here by recording the CMM on the hard disk, which implies that the window of the recorded content is encrypted and personalised. The commitment to the extent of recording is however still under the control of the HDVR.

For the variants in which the CMPS is implemented on the same smartcard as the conditional access system, or in which the CMPS is implemented entirely in software in the middleware, it is noted that the sequence of events given in the above three walk-throughs may be different. In the latter case, the piece of software usually running on the security module/smartcard (via the RCARD device) will instead be embedded in the CMPS circle in FIGS. 22, 23 and 24.

The protocols for message exchanges, and in particular the relevant data structures, will now be described.

A certain amount of data taking place within the exchange protocols between the HDVR and CMPS is specified. They concern mainly the CMM_message messages transporting the CMM as well as the navigation information and constraints on content usage. The structure is as follows:

| Data Structure | Description |
|---|---|
| struct CMM_message { | |
|     struct CMM, | all of the CMM to be stored |
|     struct CMM.navigation, | data relating to navigation |
|     struct CMM.hdvr_rules | data relating to constraints |
| } | |

The CMM contains in its turn different structures which are detailed in the following.

The CMM_ message is in particular composed of information concerning navigation within the content. Contrary to the CMMs in which navigation and constraint data may be encrypted, these are presented in clear in the CMM_message so as to be interpreted directly by the HDVR The general structure of the CMM is given (independently of its encoding and signature) below:

| Data Structure | Description |
|---|---|
| struct CMM{ | |
|     struct CMM.navigation, | data relating to navigation |
|     struct CMM.hdvr_rules, | data relating to constraints |
|     struct CMM.content_key, | content keys (encoded) |
|     struct CMM.private_data | private data (usage rules) |
| } | |

Navigation data within the content refer to headings and are given below:

| Data Structure | Description |
|---|---|
| struct CMM.navigation{ | |
|     total_chapter_number, | total number of chapters of content |
|     chapter_index | chapter number |
| } | |

Data concerned with content usage restrictions in terms of invalid actions and time-shifting constraints are presented below:

| Data Structure | Description |
|---|---|
| struct CMM.hdvr_rules{ | |
|     trick_mode_bitmap, | invalid video recorder actions |
|     time_shifting_duration, | maximum recording length |
|     content_rating | moral level (of current chapter) |
| } | |

The protocols for message exchanges relating to the recording of a programme will now be described.

CMPS Client Library

In overview, the CMPS client library provides a set of messages for use by applications needing to interface with the CMPS system. A Security Library is also provided, featuring an extensive API to allow control of the various functions relating to the recording and playback of content. The Security Library is described in detail towards the end of the following section, and is mostly of interest with regard to the facilities provided for the creation of a secure authenticated connection (SAC).

With regard to multi-thread servers and message queues: in order to take into consideration several simultaneous recording and playback sessions, the CMPS server is capable of managing several threads (one for each client session) each possessing different message queues (message_queue) for the reception and transmission of messages (respectively request_mq and response_mq), as well as for supervision (supervision_mq) allowing management of cancellation requests. However, it is up to the main server (CMPS_main server) to treat each request to open a session (session_mq) on-demand by the CMPS clients and, if the case should arise, to create new instances of the server. The principle is summarised in FIG. 27. In variants of the preferred embodiment, the CMPS server is a mono-server but multi-session software component.

The sets of messages given in the following section correspond to all of the messages used in the preferred embodiment. In variants of the preferred embodiment, further messages are used to enhance the functionality of the system, and in other variants, some messages are omitted.

The first set of messages relates to session management, and the syntax is as follows:—

| Message Syntax | Description |
|---|---|
| MhwCmps_Open_session_Req ( | |
|     message_tag, | |
|     mode, | recording/playback mode |
|     CRID | Content Referencing ID (contains the service_id) |
| ) | |
| Message Syntax | Description |
| MhwsCmps_Open_Session_Cnf( | |
|     message_tag, | |
|     status, | return code |
|     session_id, | session identifier |
|     request_mq_id, | mq request identifier |
|     response_mq_id, | mq response identifier |
|     supervision_mq_id, | mq supervisor identifier |
|     server_id, | server identifier |
|     session_key | session key (buffer) |
| ) | |

| Message Syntax | Description |
|---|---|
| MhwCmps_Close_Session_Req( | |
|     message_tag, | |
|     session_id, | session identifier |
|     server_id | server identifier |
| ) | |

| Message Syntax | Description |
|---|---|
| MhwCmps_Close_Session_Cnf( | |
|     message_tag, | |
|     status, | return code |
|     session_id | session identifier |
| ) | |

| Message Syntax | Description |
|---|---|
| MhwCmps_Get_CMM_Req( | |
|     message_tag | |
|     session_id, | session identifier |
|     component_id, | component identifier |
|     request_number | number of request (for component_id) |
| ) | |

The first set of messages relates to the recording of programmes, and the syntax is as follows:—

| Message Syntax | Description |
|---|---|
| MhwCmps_Get_CMM_Req( | |
|     message_tag | |
|     session_id, | session identifier |
|     component_id, | component identifier |
|     request_number | number of request (for component_id) |
| ) | |

| Message Syntax | Description |
|---|---|
| MhwCmps_Get_CMM_Cnf( | |
|     message_tag, | |
|     status, | return code |
|     session_id, | session identifier |
|     component_id, | component identifier |
|     request_number, | number of request (for component_id) |
|     CMM_message | CMM and navigation information |
| ) | |

The first set of messages relates to the playback of programmes, and the syntax is as follows:—

| Message Syntax | Description |
|---|---|
| MhwCmps_Get_Content_Key_Req( | |
|     message_tag, | |
|     session_id, | session identifier |
|     request_number, | number of request |
|     CMM | CMM to be processed |
| ) | |

| Message Syntax | Description |
|---|---|
| MhwCmps_Get_Content_Key_Cnf( | |
|     message_tag, | |
|     status, | return code |
|     session_id, | session identifier |
|     request_number, | number of request |
|     content_key, | content keys (CWs) |
|     updated_CMM, | CMM to be stored |
|     next_session_key | next session key (optional) |
| ) | |

The first set of messages relates to the cancellation of requests, and the syntax is as follows:—

| Message Syntax | Description |
|---|---|
| MhwCmps_Cancel_Req( | |
|     message_tag, | |
|     session_id, | session identifier |
|     component_id, | component identifier |
|     request_number, | number of request (for component_id) |
|     server_id, | server identifier |
|     first_request_number, | start cancellation period request |
|     last_request_number | end cancellation period request |
| ) | |

| Message Syntax | Description |
|---|---|
| MhwCmps_Cancel_Cnf( | |
|     message_tag, | |
|     status, | return code |
|     session_id, | session identifier |
|     component_id, | component identifier |
|     request_number, | number of request (for component_id) |
|     server_id, | server identifier |
|     first_request_number, | start cancellation period request |
|     last_request_number | end cancellation period request |
| ) | |

Interface Between the CMPS and the Conditional Access System

The following section defines the interface between the conditional access system and the content management protection system (CMPS) for receiver/decoders provided with an internal and/or external mass storage device. It highlights in particular the division of responsibilities between the two systems while presenting their two respective roles.

As used herein, features referred to as being implemented in hardware may generally be implemented in software, and vice versa. More specifically, features present in smartcards, such as the CMPS encryption and decryption facilities, may be provided in software, such as in the middleware, for example, and vice versa. Furthermore, as is noted elsewhere, there is no rigid division between the conditional access and CMPS subsystems in the receiver/decoder.

In this vein, throughout the document, the ideas of the conditional access security module/smartcard (CAS SM) and content management security module (CMPS SM) are used generically to designate, at the same time, the hardware and software modules of the corresponding systems and should not be considered as necessarily connected to different physical entities.

The respective roles of the CMPS and the CAS, and in particular their interrelationship, will now be described.

Figure 28:
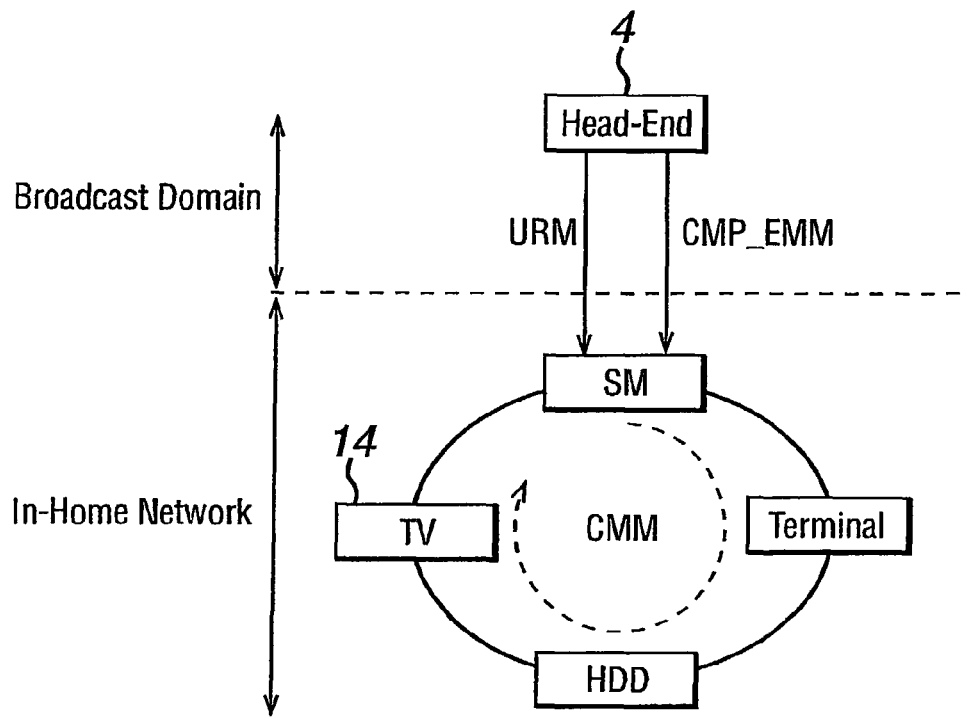
FIG. 28 is a schematic illustration of the separation between broadcast information and locally generated information.

In order to implement the various features of the CMPS system, a certain amount of management and control data is defined. To this end, the broadcast information (CMP_EMM and URM is distinguished from that which is generated and manipulated locally by the CMPS system (the CMMs, in other words). This local data is described above. The separation between broadcast information and locally generated information is shown schematically in FIG. 28.

Equally the ECM and CAS_EMM (peculiar to the conditional access system) are distinguished from the URM and CMP_EMM.

The Usage Rules Message (URM) will now be described in more detail.

In contrast to the ECM, the URM does not contain control words which are carried in the ECM (transportation of control words is the responsibility of the Conditional Access System); the URMs only contain the usage rules and effectively reduce to CMI (content management information) giving the content usage criteria. They may optionally contain a content or heading key generated at the level of the head end. This characteristic allows broadcasting to be freed from the synchronisation constraints connected to the duration of the cryptoperiod and to minimise the need for head end developments. Furthermore, the URMs may be encrypted for transmission by an algorithm independent of the Conditional Access System (DES for example, which may be envisaged in software) but possibly by the same exploitation keys as those used by the Conditional Access System.

The CMPS Entitlement Management Message (CMP_EMM) will now be described in more detail.

The CMP_EMMs contain usage rights for contents associated with each usage scenario peculiar to the CMPS system. The PIDs of the CMP_EMMs are referred to in the Conditional Access Table (CAT), and identified as such as soon as the value of the CAS_id corresponds to the GMPS. Like the URMs, the CMP_EMMs are encrypted before transmission by an algorithm which may be independent of the CAS but the CMP_EMMs support the same distribution modes as the CAS_EMMs (audience, group, individual).

In this context the CAS SM (Conditional Access System Security Module, or CAS smartcard) transmits the control words to the CMPS SM (Content Management and Protection System Security Module, or CMPS smartcard) at the request of the CMPS according to the client model (CMPS)/server (CAS) between the two systems, across a secure authenticated connection (SAC).

Generally, a protocol for Authentication and Key Exchange (AKE) is defined to secure the exchange of sensitive data between the CMPS and Conditional Access applications present in the smartcard. This protocol assumes that certain cryptographic algorithms (encryption, hash functions and so on) are supported by the two systems as long as they remain in separate security modules.

Figure 29:
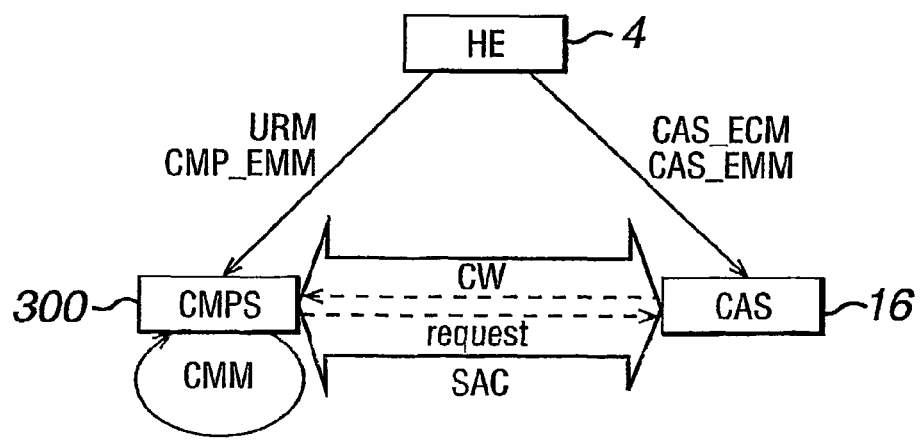
FIG. 29 is an illustration of the formation of the CMM from the broadcast control and management messages.

The formation of the CMMs from the broadcast control and management messages is illustrated schematically in FIG. 29.

The division of responsibilities between the Conditional Access System (CAS) and the Content Management and Protection System (CMPS) is as follows:—

- The CAS EMMs convey immediate content usage rights, as well as subscription rights (including those relative to the CMPS system).
- The URMs convey usage rules (except subscription) differentiated by content as well as legal content usage rights.
- The ECMs contain control words and criteria for content access in terms of subscription and immediate use.
- The URMs only contain commercial and legal content usage criteria. In variants of the preferred embodiment, however, they contain further data, relating to conditional access and/or other information.
- If the content usage criteria of the URM corresponds to rights contained in the CMP_EMM (or more simply to the copying regulations for the various usage scenarios), the CMPS SM calls for the control words at the CAS SM which sends it back to them under certain conditions relevant to conditional access systems (subscription etc) via a secure and authenticated connection previously established between the two security modules/smartcards. In scenarios involving content personalisation, the CMPS SM generate a message which is unique to it (CMM) containing the control words and content usage rules. The CMPS system takes charge of secure content management in an autonomous fashion;
- When the ECMs prohibit access to a current programme (deferred usage solely on the locally recorded content as in the case of the push mode or impulse buying of recorded content), the CAS is able to supply the control words to the CMPS SM for creation of current CMMs to be recorded and for eventual content usage.

This division of responsibilities brings about a solution to the problem of the use of archive content (a user who desubscribes will no longer have access to premium CMPS services but may continue to use the archived content) and confers a relative independence between the CAS and the CMPS, all while defining an interface between the two systems. The system furthermore addresses the functional demands of studios.

The distinction to draw between the two systems CAS and CMPS and the definition of their respective roles leads to the determination of a compromise between their independence in comparison to the redundancy of certain of their resources.

As is described elsewhere, in the preferred embodiment, two independent systems are provided (including two different physical supports); this solution may nevertheless go in the direction of a product of the access control system chosen by the operator. In another embodiment, conditional access resources are used for the CMPS system (control words, date field, subscription field and so on).

The latter embodiment can limit redundancy and simplify developments, notably in connection with the head-end. This division of resources can require in return that a more important and secure interface is achieved between the two systems (in particular the creation of secure connections for transmitting sensitive data such as control words).

In the preferred embodiment, it is necessary to specify at least a common authentication and exchange of session key protocol between the two systems. Consequently, cryptographic tools are required, comprising a symmetrical encryption algorithm and a public key signature verification algorithm. In the preferred embodiment, the X.509V3 RSA certification for authentication and the DES for encryption of the SAC is used.

Control and Management Data Passed from the CAS to the CMPS

The control and management data passed from the CAS to the CMPS may include the following:—

- Control words: in the preferred embodiment they are broadcast solely in the ECM and are consequently transmitted by a secure link to the CMPS SM (Content Management and Protection System Security Module) for the creation of the local 'ECMs' called content management messages (CMM).
- Geographic zone: when broadcast in the ECM, it may be transmitted to the CMPS SM to be represented in the CMM (taking into account constraints on zones at the time of super distribution scenarios).
- Moral code: it may be broadcast in the ECM, and may apply to all programmes. In a preferred embodiment, in the framework of the CMPS system the broadcast (m the URM) of different moral codes in different headings of a programme is envisaged. When this information is absent from the URM, the moral code broadcast by the CAS would still need to be communicated to the CMPS SM to be inserted in the CMM.
- Broadcast date: when broadcast in the ECM, it may be transmitted to the CMPS SM for representation in the CMM as the recording date (marketing scenarios of rental type).
- Session number: for reasons of security—used in order to establish a connection between the control words and the content management information, which are both conveyed independently.
- OPI: to determine the origin of the copy.

The data passed from the CMPS to the CAS may include the following:

- Subscription data: the subscription field (subscription bitmap) may be broadcast solely in the CAS_EMM. The commercial rent relative to a usage scenario appropriate to the CMPS may be transported in the URM. At the time of subscribable use of recorded content, the verification of the membership of the commercial offer in the subscription field lies with the CAS SM.

Geographic zone: in the super-distribution scenarios, this parameter may be submitted to the CAS of the addressee for validation.

Moral standard: in a preferred embodiment, under a CMPS usage scenario, this parameter may be submitted to the CAS for validation.

Modes of Operation

A personalisation mode, super-distribution mode, super-distribution in subscription mode, post-purchase super-distribution and pre-pay super-distribution mode will now be described in detail.

First, the personalisation mode will be described.

Various modes of operation of a preferred embodiment are examined in more detail below, namely personalisation mode, super-distribution in subscription mode (with a common subscription field in two systems, and with a subscription field peculiar to each system), post-purchase super-distribution, and pre-purchase super-distribution.

In the personalisation mode the CMPS system is responsible for the creation of personalised copies by encrypting the CMM by a unique user key. This key moreover depends on a content identifier (content_id) serving to broaden the user key. All usage of recorded content requires a security module to be present to personalise the copy.

The different stages of creation of the CMM in this mode are described below with reference to FIG. 30.

In stage 1500, after receiving the ECM through the CAS SM and the URM through the CMPS SM, an authenticated and secure link (symbolised by the double arrow) is established, allowing in particular the CMPS SM to recover the control words for creation of the CMM (encrypted by a user key).

In stage 1502, the CMM are sent to the file system (FS) to be recorded on a hard disk.

In stage 1504, at the time of total use of the content, the CMM are sent to the CMPS SM which validates and as may be the case, updates the usage rights for the content.

In stage 1506, when the usage rights allow, the CMPS SM sends back the control words to the descrambler to allow unscrambling of the content.

In stage 1508, the updated CMM are sent back to the file system to be reinserted in the file header. It is noted that at the time of stage 1506, the control words may possibly be returned to the file system if it is in charge of their synchronisation with the transport packets.

The super-distribution mode will now be described in more detail.

The different super-distribution scenarios allow each user to substitute for the operator. In this context a user proposes to other subscribers or to non-subscription users the contents to be shared between payment or those whose usage rights have previously been given up. Three functional scenarios are described in more detail below, namely super-distribution in subscription mode, post-purchase super-distribution and pre-purchase super-distribution.

The super-distribution in subscription mode will now be described.

In such a mode of operation there may be a common subscription field in two systems, the CAS and the CMPS, or there may be a subscription field particular to each system. These two cases are considered in turn.

In the first case, there is a common subscription field in two systems; in this case, the subscription field includes services for which one part of the management is undertaken by the CMPS (at the time of use differentiated according to content). It may be desirable to extend the length of the subscription field from 64 to 128 bits to take account of the new services associated with the CMPS.

Features of one embodiment of such a system are listed below:

Control words and subscription numbers are broadcast only in the ECM.

The CMMs are handled by the CMPS SM only.

The CMPS system allows deferred use of a content obtained in the subscription mode including after the end of the subscription period to the corresponding service.

The CMPS system allows super-distribution of the content obtained in the subscription mode.

The CMS system allows personalised recording of content obtained in subscription mode.

Access control to subscription services is the responsibility of the CAS SM.

The subscription fields are only broadcast in the CAS_EMM.

The first feature listed above implies that the verification of recorded content usage rights should not necessarily intervene in the subscription field (and consequently not necessarily the CAS SM). This may seem to be a contradiction of the second feature for which the usage of a super-distributed content is exactly conditional on the presence of a subscription in the distribution field. To clarify this point, it is appropriate to define the following functionalities:

Creation of personalised CMMs without (necessarily) verification of subscription at the time of using the associated content;

Creation of "group" CMMs adapted for super-distribution and possessing an obligatory subscription field;

Mechanisms for converting a personalised CMM into a group CMM (and vice versa). One possible solution involves defining a CMM specific to super-distribution (SD-CMM) associated exclusively with a content and of which the form will be that shown in FIG. 31.

With regard to FIG. 31, except for the header, the first field represents the part personalised by the SD-CMM and contains in particular the Content_Key key allowing decryption of the CMM (this key may be linked with the current exploitation key at the time of recording or a key generated locally by the CMPS SM). The second field allows super-distribution and contains the number of the commercial offer Commercial_Offer associated with the content Content_id. The key Group_key may be peculiar to subscription to a service or linked to an exploitation key. Taking account of the dynamic nature of this key, the field is updated before super-distribution of the content. This specific CMM is added ahead of the CMM file and completes the CMMs corresponding to the local ECMs (which contain the control words).

The different stages of creation and modification of this SD-CMM are detailed below with reference to FIG. 32.

In stage 1600, after reception of the ECMs by the CAS SM and the URMs by the CMPS SM, a secure authenticated connection is established which, in particular, allows the CMPS SM to recover the control words in order to create the CMMs.

In stage 1602, the CMMs (including the SD-CMM) are sent to the file system (FS) to be recorded on the hard disk.

In stage 1604, at the time of re-distribution of the content, the SD-CMM is sent to the CMPS SM which updates, in accordance with the rights, the field associated with the super-distribution, taking into account the current group key.

In stage 1606, the updated SD-CMM is sent back to the file system to be reinserted in the head of the file.

In stage 1608, the content as well as the associated CMMs are sent to the file system of another subscriber: super-distribution.

In stage 1610, the file system extracts the SD-CMM from the head of the file and submits it to the CMPS SM for validation and personalisation.

In stage 1612, the CMPS SM decrypts the field associated with the super-distribution of the SD_CMM, and requests the MS CAS to validate the subscription across a secure link.

In stage 1614, if the commercial offer of service is effectively presented in the subscription field, the CMPS SM modifies the first personalisation field of the SD-CMM before sending it on to the file system. If not, there may be an incentive to subscribe, in order to gain access to the super-distributed content (through a specific application).

The second case of super-distribution in subscription mode, where there is a subscription field peculiar to each system, is now examined.

When each of the two systems possesses its own subscription field, it is incumbent on the CMPS to ensure broadcast of control and management messages associated with these commercial offers. Consequently, the number of commercial offers peculiar to the CMPS is broadcast in the URM and the corresponding subscription fields in the CMP_EMM. The super-distribution scenario presented in the preceding section may then be implemented in a similar way, stage 7 of the subscription validation being ensured by the CMPS.

Post-purchase super-distribution will now be described.

In this scenario a subscriber sends a recorded content to another subscriber who must, to be able to use it, acquire the rights against payment to the operator in operating the proposed commercial scenarios.

Features of one embodiment of such a system are listed below:

The CMPS system allows post-purchase distribution of recorded contents.

The control words are broadcast only in the ECM.

The CMMs are sent to the CMPS SM.

The redistribution of the recorded content (and then the associated CMMs) whose usage is conditional on the reception of rights (for example in an EMM_U) implies certain constraints on the encryption of the CMM. In this context it is suitable to use a super-distribution key (peculiar to each content) broadcast with the rights and allowing decryption of the CMM, or more simply an SD-CMM enacting the idea in the preceding section. In this last case, the structure of the specific CMM may be as illustrated in FIG. 33.

Figures 33, 34:
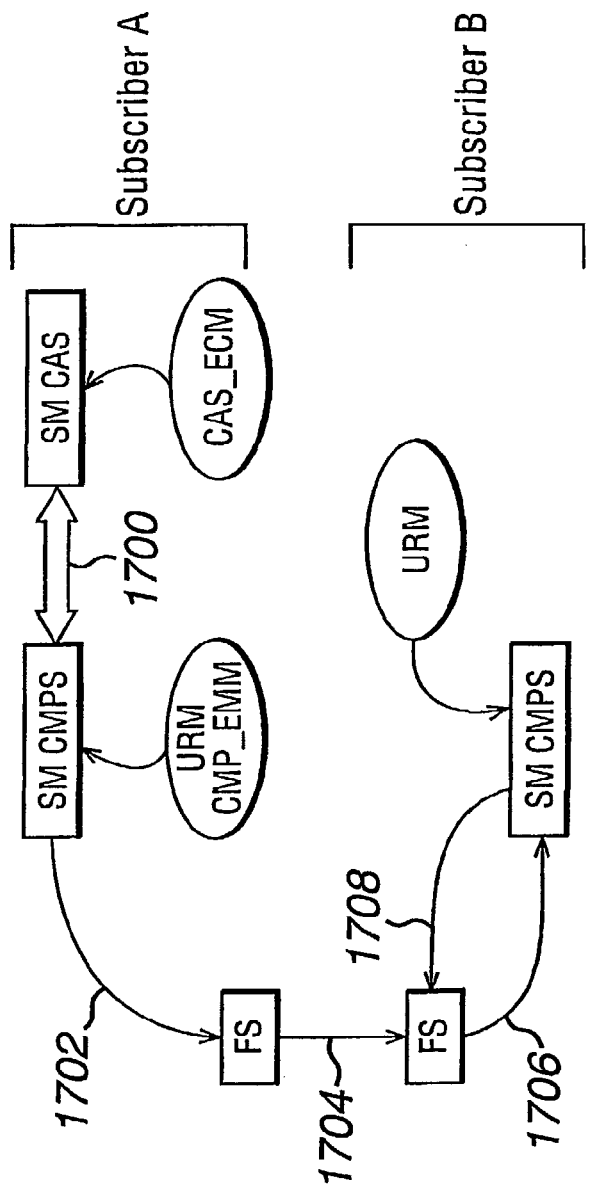
FIG. 33 is an illustration of the structure of a CMM specific to post-purchase super distribution (SD-CMM)
FIG. 34 is a schematic illustration of the different stages of creation and modification of the SD-CMM in the post-purchase super-distribution mode.

With reference to FIG. 33, as before, the first field after the header represents the personalised part of the SD-CMM and contains in particular the content key allowing decoding of the CMM (this key may be generated locally by the CMPS SM). The second field allows distribution and is preferably encrypted by the specific key SD_Key enabling it to be connected to Content_id. This specific CMM is also added to the header of the CMM file.

The different stages of creation and modification of this SD-CMM are detailed below with reference to FIG. 34.

In stage 1700, after reception of the ECM by the CAS SM and of the URM by the CMPS SM, an authenticated and secure connection is established and allows in particular the CMPS SM to recover the control words for creation of the CMM.

In stage 1702, the CMM (including the SD-CMM are sent to the file system to be recorded on the hard disk In the case where the CMP_EMM containing at the same time the utilisation rights and the super-distribution key is received by the CMPS SM after the recording phase, the SD-CMM is updated, taking account of the SD_Key present in the CMP_EMM.

In stage 1704, the content as well as the associated CMMs are sent to the file system of another subscriber: super-distribution.

In stage 1706, at the time of reception of the rights by the second subscriber, the file system extracts the SD-CMM from the header of the file and submits it to the CMPS SM for decryption and personalisation.

In stage 1708, the CMPS SM returns the personalised SD-CMM to the file system Pre-pay super-distribution will now be described.

The type of scenario considered in the pre-pay context makes it possible for a subscriber to send a recorded content to one or more other users without them having to ask for rights (at least at the time of first usage). The order (ie the payment) of the rights associated with the super-distribution scenario is then the responsibility of the sender. For simplicity, only the super-distribution scenario between subscribers is addressed in the following.

Features of one embodiment of such a system are listed below:

The CMPS system allows pre-pay super-distribution of recorded content.

The control words are broadcast solely in the CAS-ECM.

The CMMs are sent to the CMPS SM.

As in the preceding scenario, the usage of a super-distribution key may be envisaged. Under constraint of the separation of the utilisation rights and the recorded content, the described stages in the preceding section remain valid in conditioning the transmission of rights to a subscriber by the previous command of the sending subscriber. The request may be passed to the command server (telephone, Minitel and so on) or directly by the return path of the IRD (by specifying, for example, the GUI, or the programme which one would prefer to redistribute and the number of the benefiting subscriber).

Security Library

The security library (or API) permits use of security functions independently from specific implementations or means of data transportation It consists of a catalogue of high level functions. This API allows creation of secure connections "end-to-end" made up of multiple interfaces (for example from the publisher of the content to the recording equipment of the domestic network) and authorises the ultimate responsibility for new technologies such as water marking, at the demand of content supplier. Assisting the flow of control/command data, it provides the system with the flexibility of allowing it to take account of new means of management and to adapt to different commercial scenarios.

The following sections, a non-exclusive list of APIs which may be included in the security library of the CMPS, raise issues on the usage of a client-server model between the CMPS SM and the group of equipment with which a secure connection (SAC) is established. Notably, the concept of a session is introduced, which can allow a much greater flexibility for management of the SAC.

The functions forming part of the Client-Server API are as follows:—

InitSession (Module_id, Device_id, Session_id) A client-server session between the SM and a chosen device, for example an authentication mechanism and a group of crypto tools utilised on the secure links.

CloseSession (Module_id, Device_id Session_id). Closes a client-server session.

Send/ReceiveClientinfo (Module_id, Device_id) Allows transmission and reception of the cryptographic functionalities (for example supported authentication mechanisms) of the device Device_id.

Send/Receive (Cryto_Suite_id, Module_id, Device_id, Session_id) Allows initiation of an authentication protocol between an SM and a device apart from the functionalities supported by the device.

The functions forming part of the API for the creation of secure connections (SAC) are as follows:—

OpenChannel (Module_id, Device_id, Sac_id, Session_id) High level API allowing opening of a secure connection between Module_id and Device_id.

CloseChannel (Sac_id, Session_id) High level API allowing closure of a connection at the initiative of the SM.

CardChaining (New_Module_id, Old_Module_id) Denotes a mechanism for substitution of the SM, in using for example the information section 8.10 of the NRS S-B specification GetCertificate (Device_id, Session_id) Returns the certificates for Device_id for the Session_id session.

Send/Receive (Data, Sac_id, Session_id) Permits transmission and reception of the data on the Sac_id connection.

SendSessionKey (Session_key, Device_id, Sac_id, Session_id) Allows transmission of a session key (Session_key) on the Sac_id connection using a public key algorithm.

RenewSessionKey (Sac_id, Session_id) Request for renewal of the session key on the Sac_id connection.

NewChannel (Sac_id, Session_id) Enables the establishment of a new connection between a client and a server using the Session_id session.

The functions forming part of the Crypto API are as follows:—

GenRandom (size) Enables generation of a random number of a certain number of bits.

Sign (Sig_Algorithm_id, data) Requests signature of the "data" data using the algorithm defined by the Sig_Algorithm_id.

Verify (Sig_Algorithm_id, data) Verifies the signature of the "data" data using an algorithm defined by Sig_Algorithm_id.

Content-Decrypt/Encrypt (ContentData, Sac_id, Session_id) A Allows decrypting/encrypting of the content data on the Sac_id connection.

Functional Scenarios

Several different functional scenarios associated with the CMPS system will be described, as regards utilisation as well as content management.

From the point of view of its architecture, the CMPS is based on the creation of secured and authenticated logical connections between the SM (Security Module) and the terminal via specialised cryptographic means and standardised certification, such as X509v3. These connections can ensure the secured transmission of a variety of information for management and control and of contents to be protected.

The CMPS system does not jeopardise the operation of the usual navigation functions in the contents associated with a "virtual" digital VTR, in particular, rapid fast-forward and rewind, picture-by-picture advance, pause, and playback during transmission of a programme (time shifting functions).

The CMPS system can, on the other hand, guarantee a maximum extent of recording time (for example, 30 minutes worth of film for a total duration of 90 minutes) for time shifting applications conforming to the requirements of certain studios. The CMPS system can also allow the user to ensure protection of confidential data (user profile, web preferences, book-marks, e-mails etc).

The CMPS system can support the setting up and maintenance of new operational models based on the use of a mass storage device at the consumer's end; in particular it can support new distribution methods for the television operators, including:

Transmission in "push" mode of the contents (A/V and music) to the hard disk using free bandwidth during the night, all or part (free view and free listening) of the recorded content being scrambled. After seeing the preview, the user may choose or not to receive the content; in the case of purchase, he receives the right; in the case of refusal, the information is erased from the hard disk Delivery in push mode may be at the instigation of the consumer ("on demand") or the operator using subscriber profiles.

Rental models: use of content stored on hard disk a predetermined number of times or within a time window defined by the operator (usage possibly conditional on payment).

Multiple marketing methods: recorded information may be accessible under various usage scenarios (for example, one week, fortnight, twice) and consequently at variable cost, including after expiry of initial rights.

Super-distribution: the user takes the place of the operator, the user suggests to the other subscribers of the same contents to share them, in return for payment or where usage rights have been paid for in advance. This usage model permits the operator and the service providers to exploit to the full the network infrastructure of the operator, or indeed the public communication networks.

COD (Content On Demand); audio/visual, music, files (games, MP3) data. The manner of recording advertisements (and its image) imposed by contractual links between the operator and advertiser.

Control of multiple copies (except private copies) which may require a payment (re-distribution).

The CMPS system allows existing functionalities to be extended in terms of access to content (subscription and Pay-per-View modes) as long as the subscriber has a mass storage device. As well as traditional video recorder functionalities and those of time-shifting made possible by simultaneous record and playback, this backup memory allows operators to put in place new marketing methods exploiting the memory capacity at the subscriber's premises.

The following "user" services, based on mass storage devices (with the CMPS system put into play), can be provided:—

Standard and enhanced video recorder functions (thanks to simultaneous read/write) include both simply recording a programme, and recording a programme at the same time as viewing another (live or pre-recorded), restricted by the absence of a second reception channel.

Time shift functions; with regard to a maximum recording time (protection being reinforced by personalizing the recording). Nevertheless, access to time shifting is differentiated according to the distribution method of the contents (for example, content made available as pay-per-view and multi-transmissions may be subject to restricted access to this function, without which N broadcasts may be enough to record piece-by-piece the whole content).

Combination of the above two scenarios (time-shifting and simultaneous viewing of a recorded program)

Protection of confidential user data (profile, web preferences, emails, e-commerce, personal banking data etc)

Various modes for distribution and marketing of content are possible.

A first set of such modes includes "Push" modes of targeted or on-demand content (alternative between NVOD (Near Video-on-Demand) and VOD (Video-on-Demand) windows), which feature the following features:—

Fixed rate subscription taken out with the operator: the user subscribes to a service which periodically presents new content to him (movie previews, MP3 files and so on) in accordance with his profile. The content is put on the disc in a transparent form for the subscriber. Usage is usually differentiated. In all cases, including super-distribution defined below, it remains under the control of the operator.

Ordering: the user orders content for later use, all or part of the payment being postponed until usage.

Super-distribution: the user takes the place of the operator, he suggests to the other sub scribers to the contents to share in return for payment or where the usage rights have been paid for in advance. Several modes of operation are possible. As an example, the sending subscriber sends the content or a content reference to a destination subscriber; the operator transmits it (streaming or download) towards the destination subscriber along with the associated rights or the subscriber connects to the MAP site to retrieve his content.

A second set of such modes involves personalised recordings, including the following features:—

The right to make private digital copies (according to the legislation in force in certain countries), the CMPS ensures it stays in the family framework.

Fixed price offer: the user records the whole content of a marketing offer (apart from private copy) and acquires the user rights associated with the offer.

Ordering: the user orders a content as well as a user scenario (one or more viewings, viewing limited by time etc).

Impulse (per showing or playing time): ditto, but for immediate use of a previously recorded content.

A third set of modes directed to advertising is also envisaged. In such modes, it may be of mutual interest to the advertiser and the operator to ensure that advertising spots are not purely and simply skipped at the time of recording and during navigation through Video Recorder functions and time-shifting.

The previous point may give rise to marketing models for which recording of a programme exempt from advertising and/or trailers may be more demanding than recording the same programme carrying advertisements and/or trailers.

Yet further modes are also envisaged, owing to the great flexibility of the system as described herein.

It will be understood that the present invention has been described above purely by way of example, and modifications of detail can be made within the scope of the invention.

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. A method for receiving and storing of scrambled content in which the scrambled content is received together with encrypted control words, control words being used for descrambling the scrambled content, comprising the steps of:
   receiving, by a receiver/decoder, the scrambled content and encrypted control words, said control words being encrypted by an exploitation key ($K_G$);
   decrypting said encrypted control words in a removable security module with the exploitation key ($K_G$), said removable security module being received by the receiver/decoder;
   receiving, by the receiver/decoder, a usage rules message (URM) comprising usage rules and corresponding to the scrambled content, wherein the usage rules included within the URM depend upon the scrambled content, independent of a number of recordings by the receiver/decoder, and impose usage constraints that restrict the playback and reproduction of a descrambled version of the scrambled content stored on a mass storage device, and wherein the URM is stored on the mass storage device;
   encrypting the decrypted control words and the URM by a local key ($K_L$) to produce an encrypted control management message (CMM), wherein the CMM comprises:
      the URM,
      the control words extracted from an entitlement control message (ECM), and
      an Entitlement Management Message (EMM) comprising access rights associated with a user for playback and recording of the scrambled content,
      wherein the CMM is encrypted as a single data unit; and
   storing said scrambled content and said encrypted control management message (CMM) in different files on the mass storage device of the receiver/decoder.

2. The method according to claim 1, wherein said usage rules impose at least one of the constraints selected from a group consisting of:
   restriction on time-shifting;
   restriction on fast-forwarding;
   restriction on the number of times a recorded content can be played back; and
   restriction on available reproduction modes.

3. The method according to claim 1, wherein the URM associated with said usage rules is encrypted by a second exploitation key which may be identical to or different from the exploitation key, said URM being decrypted before being encrypted by the local key.

4. The method according to claim 2, wherein the URM associated with said usage rules is encrypted by a second exploitation key which may be identical to or different from the exploitation key, said URM being decrypted before being encrypted by the local key.

5. The method according to claim 1, further comprising:
   receiving a request to use the content stored in the mass storage device;
   extracting the control words and the usage rules data from the control management message;
   validating the request in dependence on said control words and usage rules data.

6. The method according to claim 2, further comprising:
   receiving a request to use the content stored in the mass storage device;
   extracting the control words and the usage rules data from the control management message;
   validating the request in dependence on said control words and usage rules data.

7. The method according to claim 3, further comprising:
   receiving a request to use the content stored in the mass storage device;
   extracting the control words and the usage rules data from the control management message;
   validating the request in dependence on said control words and usage rules data.

8. An apparatus comprising a receiver/decoder and a removable security module for storing a scrambled content in which the scrambled content is received together with encrypted control words, wherein the control words are used for descrambling the scrambled content, comprising:

a mass storage device in the receiver/decoder;
means in the receiver/decoder for receiving the scrambled content and the encrypted control words, said control words being encrypted by an exploitation key ($K_G$);
means in the removable security module for decrypting said encrypted control words with an exploitation key ($K_G$),
means in the receiver/decoder for receiving usage rules messages (URMs) comprising usage rules and corresponding to the scrambled content, wherein the URMs are received prior to the scrambled content and encrypted control words, wherein the usage rules included within the URMs depend upon the scrambled content, independent of a number of recordings by the receiver/decoder, and impose usage constraints that restrict the playback and reproduction of a descrambled version of the scrambled content stored on a mass storage device, and wherein the URM is stored on the mass storage device;
means for encrypting said control words and usage rules messages by a local key ($K_L$) to produce encrypted control management messages (CMM), wherein the CMM comprises:
the URM,
the control words extracted from an entitlement control message (ECM), and an Entitlement Management Message (EMM) comprising access rights associated with a user for playback and recording of the scrambled content,
wherein the CMM is encrypted as a single data unit; and
means in the receiver/decoder for passing said scrambled content and encrypted content management messages in different files onto the mass storage device.

9. The apparatus according to claim 8, further comprising:
means in the receiver/decoder for reading the scrambled content on the mass storage device;
means for reading the encrypted control management messages on the mass storage component device;
means for decrypting the encrypted content management messages thereby producing usage rules and control words;
a module in the receiver/decoder to compare the usage rules and rights acquired by the subscriber and stored either in the removable security module or in a secure location inside the receiver/decoder; and
means in the receiver/decoder for allowing the scrambled content to be descrambled if said module decides that a user of the receiver/decoder is entitled to view the material.

10. A method for transmitting content to a receiver/decoder incorporating or provided separately with a mass storage device, comprising:
transmitting a content, wherein the content is transmitted in scrambled form;
transmitting content management information and conditional access information corresponding to the content in the form of separate packets prior to transmitting the content, wherein said content management information comprises a usage rules message (URM), comprising usage rules, that depends upon the content, independent of a number of recordings by the receiver/decoder, and imposes usage constraints on the playback and reproduction of a descrambled version of the content after the scrambled content is stored on the mass storage device, wherein the URM is stored on the mass storage device, and wherein said conditional access information comprises an Entitlement Control Message (ECM) including control words for descrambling the scrambled content and an Entitlement Management Message (EMM) comprising access rights to the content associated with a subscriber;
receiving the conditional access information, receiving the content management information, and combining the received conditional access information and content management information into an encrypted control management message (CMM), wherein the CMM comprises:
the URM,
the control words extracted from an entitlement control message (ECM), and
the Entitlement Management Message (EMM),
wherein the CMM is encrypted as a single data unit; and
storing said scrambled content and said encrypted control management message (CMM) in different files on the mass storage device of the receiver/decoder.

11. The method according to claim 10, wherein said content management information imposes at least one of the constraints from a group consisting of:
restriction on time-shifting;
restriction on fast forwarding;
restriction on the number of times a recording can be played back; and
restriction on available reproduction modes.

12. The method according to claim 10, wherein said content management information is encrypted with an exploitation key which may be the same key or a different key than the exploitation key used to encrypt the conditional access information.

13. The method according to claim 11, wherein said content management information is encrypted with an exploitation key which may be the same key or a different key than the exploitation key used to encrypt the conditional access information.

14. An apparatus comprising a receiver/decoder incorporating or provided separately with a mass storage device and removable security module, said apparatus comprising:
means for receiving a scrambled content;
means for receiving conditional access messages, said conditional access messages containing control words in encrypted form, said control words being used for the descrambling of the scrambled content;
means for receiving usage rules messages (URMs) prior to receiving the scrambled content, said usage rules messages and said conditional access messages being in the form of separate packets and said usage rules messages comprising usage rules that depend upon the scrambled content, independent of a number of recordings by the receiver/decoder, and impose usage constraints that restrict the playback and reproduction of a descrambled version of the scrambled content after storage of the scrambled content on said mass storage device, and wherein the URM is stored on the mass storage device; and
means for encrypting by a local key said control word and usage rules data thereby producing control management messages (CMMs), wherein the CMM comprises:
the URM,
the control words extracted from an entitlement control message (ECM), and
an Entitlement Management Message (EMM) comprising access rights associated with a user for playback and recording of the scrambled content,
wherein the CMM is encrypted as a single data unit; and means for passing said control management messages in different files to the mass storage device.

15. The apparatus according to claim 14, further comprising:
    means for receiving a request to use the scrambled content stored in the mass storage device;
    means for receiving the control management messages comprising conditional access information and content management information from the mass storage device;
    means for extracting the conditional access information and content management information from the control management messages; and
    means for validating the request in dependence on the conditional access information and the content management information.

16. The apparatus according to claim 14, comprising means to compare the usage rules in the recorded content management messages with the rights acquired by a subscriber using the receiver/decoder to ensure the validity of the associated rights.

17. The apparatus according to claim 15, comprising means to compare the usage rules in the recorded content management messages with the rights acquired by a subscriber using the receiver/decoder to ensure the validity of the associated rights.

18. The method of claim 1, wherein the receiver/decoder receives a message comprising the exploitation key ($K_G$).

19. The apparatus of claim 8, further comprising:
    means for receiving a message comprising the exploitation key ($K_G$).

20. The method of claim 1, wherein the URM comprises legal and commercial access criteria related to a particular portion of the scrambled content.

21. The apparatus of claim 8, wherein the URM comprises legal and commercial access criteria related to a particular portion of the scrambled content.

22. The apparatus of claim 14, wherein the URM comprises legal and commercial access criteria related to a particular portion of the scrambled content.

* * * * *